(12) United States Patent
Wang et al.

(10) Patent No.: US 12,056,848 B2
(45) Date of Patent: Aug. 6, 2024

(54) SYSTEMS AND METHODS FOR IMAGE PROCESSING

(71) Applicant: ZHEJIANG DAHUA TECHNOLOGY CO., LTD., Zhejiang (CN)

(72) Inventors: Song Wang, Hangzhou (CN); Dong Zhang, Hangzhou (CN); Keqiang Yu, Hangzhou (CN); Xinjie Hu, Hangzhou (CN); He Wei, Hangzhou (CN); Xiaomu Liu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 438 days.

(21) Appl. No.: 17/454,833

(22) Filed: Nov. 15, 2021

(65) Prior Publication Data

US 2022/0076394 A1 Mar. 10, 2022

Related U.S. Application Data

(63) Continuation of application No. PCT/CN2019/107066, filed on Sep. 20, 2019.

(30) Foreign Application Priority Data

May 24, 2019 (CN) .......................... 201910441383.9

(51) Int. Cl.
*G06T 5/50* (2006.01)
*H04N 23/71* (2023.01)
*H04N 23/76* (2023.01)

(52) U.S. Cl.
CPC ............... *G06T 5/50* (2013.01); *H04N 23/71* (2023.01); *H04N 23/76* (2023.01); *G06T 2207/10048* (2013.01); *G06T 2207/20221* (2013.01)

(58) Field of Classification Search
CPC ............. G06T 5/50; G06T 2207/10048; G06T 2207/20221; G06T 5/94;
(Continued)

(56) References Cited

U.S. PATENT DOCUMENTS

| 5,450,216 A * | 9/1995 | Kasson | ................ | H04N 1/6058 382/167 |
| 8,319,853 B2 * | 11/2012 | Fukuda | .................. | H04N 9/646 348/241 |

(Continued)

FOREIGN PATENT DOCUMENTS

| CN | 101231748 A | 7/2008 |
| CN | 203193791 U | 9/2013 |

(Continued)

OTHER PUBLICATIONS

International Search Report in PCT/CN2019/107066 mailed on Feb. 27, 2020, 4 pages.

(Continued)

*Primary Examiner* — Phuoc Tran
(74) *Attorney, Agent, or Firm* — METIS IP LLC

(57) ABSTRACT

The present disclosure relates to systems and methods for image processing. The system may obtain low-frequency component of a first image. For each element of the first image, the system may adjust a luminance of the element in response to determining that the luminance of the element is less than a predetermined luminance threshold. The system may determine a first luminance weight map corresponding to the first image based on the adjusted luminance of each element of the first image. The system may obtain low-frequency component of a second image and determine a second luminance weight map corresponding to the second image based on a luminance of each element of the second image. The system may further determine a fused image based on the low-frequency component of the first image, (Continued)

the first luminance weight map, the low-frequency component of the second image, and the second luminance weight map.

20 Claims, 17 Drawing Sheets

(58) Field of Classification Search
CPC .......... G06T 2207/10024; G06T 2207/20021; H04N 23/71; H04N 23/76
See application file for complete search history.

(56) References Cited

U.S. PATENT DOCUMENTS

| | | | |
|---|---|---|---|
| 10,614,561 B2* | 4/2020 | Li | ............................ G06T 5/50 |
| 2012/0249801 A1 | 10/2012 | Nozaki | |
| 2013/0058590 A1 | 3/2013 | Weiss | |
| 2015/0055886 A1 | 2/2015 | Oh et al. | |
| 2018/0227509 A1 | 8/2018 | Huang et al. | |
| 2019/0213723 A1 | 7/2019 | Luo et al. | |
| 2019/0318463 A1 | 10/2019 | Zhang et al. | |

FOREIGN PATENT DOCUMENTS

| | | |
|---|---|---|
| CN | 104683767 A | 6/2015 |
| CN | 104835130 A | 8/2015 |
| CN | 106600572 A | 4/2017 |
| CN | 106611408 A | 5/2017 |
| CN | 106815827 A | 6/2017 |
| CN | 106875371 A | 6/2017 |
| CN | 107103596 A | 8/2017 |
| CN | 108259774 A | 7/2018 |
| CN | 108389158 A | 8/2018 |
| CN | 108549874 A | 9/2018 |
| CN | 109242815 A | 1/2019 |
| WO | 2018120936 A1 | 7/2018 |

OTHER PUBLICATIONS

Written Opinion in PCT/CN2019/107066 mailed on Feb. 27, 2020, 4 pages.
First Office Action in Chinese Application No. 201910441383.9 mailed on Jan. 25, 2021, 10 pages.
The Extended European Search Report in European Application No. 19931224.0 mailed on Jun. 3, 2022, 9 pages.

* cited by examiner

400

- Obtaining a low frequency component of a visible image and a low frequency component of an infrared image, wherein the low frequency component of the visible image includes a luminance of each window in the visible image and the low frequency component of the infrared image includes a luminance of each window in the infrared image — 401

- In response to determining that the luminance of any window in the visible image is less than a predetermined adjustment threshold, increasing the luminance of the window — 402

- Obtaining a luminance weight map corresponding to the visible image with adjusted luminance based on an adjusted luminance of each window in the visible and a luminance weight map corresponding to the infrared image based on the luminance of each window in the infrared image — 403

- Generating a fused image based on the low frequency component of the visible image, the low frequency component of the infrared image, the luminance weight map corresponding to the visible image with adjusted luminance, and the luminance weight map corresponding to the infrared image — 404

Performing a compensation operation on the first image based on a predetermined target luminance — 1001

Determining the first predetermined maximum weight associated with the low-frequency component of the first image or the second predetermined maximum weight associated with the low-frequency component of the second image based on a compensation value associated with the compensation operation according to a relationship between compensation value and maximum weight — 1002

```
┌─────────────────────────────────────────────────────────────┐
│ Determining a low-frequency component difference based on the│ ─── 1401
│ low-frequency component of the first image and the low-      │
│ frequency component of the second image                      │
└─────────────────────────────────────────────────────────────┘
                              │
                              ▼
┌─────────────────────────────────────────────────────────────┐
│ Determining the second luminance weight map corresponding to │
│ the low-frequency component of the second image based on the │ ─── 1402
│ second predetermined maximum weight associated with the low-│
│ frequency component of the second image and a luminance of   │
│ each element in the low-frequency component difference       │
└─────────────────────────────────────────────────────────────┘
```

FIG. 14

SYSTEMS AND METHODS FOR IMAGE PROCESSING

CROSS-REFERENCE TO RELATED APPLICATIONS

This application is a Continuation of International Application No. PCT/CN2019/107066, filed on Sep. 20, 2019, which claims priority to Chinese Patent Application No. 201910441383.9 filed on May 24, 2019, the contents of which are incorporated herein by reference in their entirety.

TECHNICAL FIELD

The present disclosure generally relates to image processing, and in particular, to systems and methods for image fusion.

BACKGROUND

With the development of video surveillance technology in various fields (e.g., environment monitoring, security monitoring), the exploration of image processing has developed rapidly nowadays. Take image fusion as an example, an image processing system can receive a first weight corresponding to a first image (e.g., a visible image) and a second weight corresponding to a second image (e.g., an infrared image). According to the first weight and the second weight, the image processing system can determine a fused image by performing a linear weighting on the first image and the second image. However, in some situations, the linear weighting performed on the first image and the second image may result in a luminance reversal in a portion of the fused image, thereby resulting in an abnormality or a distortion. Therefore, it is desirable to provide image processing systems and methods for determining suitable weights for images and thereby improving the quality and efficiency of image fusion.

SUMMARY

An aspect of the present disclosure relates to a method for image fusion. The method may include obtaining a low-frequency component of a visible image and a low-frequency component of an infrared image, wherein the low-frequency component of the visible image may include a luminance of each window in the visible image and the low-frequency component of the infrared image may include a luminance of each window in the infrared image; in response to determining that the luminance of any window in the visible image is less than a predetermined adjustment threshold, increasing the luminance of the window; obtaining a luminance weight map corresponding to the visible image with adjusted luminance based on an adjusted luminance of each window in the visible image; obtaining a luminance weight map corresponding to the infrared image based on the luminance of each window in the infrared image; and generating a fused image based on the low-frequency component of the visible image, the low-frequency component of the infrared image, the luminance weight map corresponding to the visible image with adjusted luminance, and the luminance weight map corresponding to the infrared image.

In some embodiments, before increasing the luminance of the window in response to determining that the luminance of any window in the visible image is less than a predetermined adjustment threshold, the method may further include obtaining the predetermined adjustment threshold based on a predetermined maximum weight associated with the visible image, a predetermined luminance confidence associated with the visible image, and a predetermined maximum weight associated with the infrared image.

In some embodiments, before increasing the luminance of the window in response to determining that the luminance of any window in the visible image is less than a predetermined adjustment threshold, the method may further include performing a compensation operation on the visible image until a luminance of the compensated visible image reaches a predetermined target luminance; obtaining a compensation value; and obtaining the predetermined maximum weight associated with the infrared image based on the compensation value.

In some embodiments, the obtaining a luminance weight map corresponding to the visible image with adjusted luminance based on an adjusted luminance of each window in the visible image may include obtaining an initial luminance weight corresponding to each window in the visible image based on the predetermined maximum weight associated with the visible image, the predetermined luminance confidence associated with the visible image, and the adjusted luminance of each window in the visible image; and obtaining the luminance weight map corresponding to the visible image with adjusted luminance by performing an amplitude limiting on the initial luminance weight corresponding to each window in the visible image based on the predetermined maximum weight associated with the visible image.

In some embodiments, the obtaining a luminance weight map corresponding to the infrared image based on the luminance of each window in the infrared image may include obtaining a low-frequency component difference corresponding to each window based on the low-frequency component of each window in the infrared image and the low-frequency component of each window in the visible image; and obtaining the luminance weight map corresponding to the infrared image based on the predetermined maximum weight associated with the infrared image and the low-frequency component difference.

In some embodiments, the obtaining the luminance weight map corresponding to the infrared image based on the predetermined maximum weight associated with the infrared image and the low-frequency component difference may include obtaining an adjusted low-frequency component difference by processing the low-frequency component difference based on a predetermined first weight; and obtaining the luminance weight map corresponding to the infrared image based on the predetermined maximum weight associated with the infrared image and the adjusted low-frequency component difference.

In some embodiments, the generating a fused image based on the low-frequency component of the visible image, the low-frequency component of the infrared image, the luminance weight map corresponding to the visible image with adjusted luminance, and the luminance weight map corresponding to the infrared image may include obtaining a fused weight map corresponding to the visible image and the infrared image based on the luminance weight map corresponding to the visible image with adjusted luminance and the luminance weight map corresponding to the infrared image; and obtaining the fused image based on the fused weight map, the low-frequency component of the visible image, and the low-frequency component of the infrared image.

Another aspect of the present disclosure relates to an image fusion device. The image fusion device may include an obtaining module and a processing module. The obtaining module may be configured to obtain a low-frequency component of a visible image and a low-frequency component of an infrared image, wherein the low-frequency component of the visible image may include a luminance of each window in the visible image and the low-frequency component of the infrared image may include a luminance of each window in the infrared image. The processing module may be configured to increase the luminance of the window in response to determining that the luminance of any window in the visible image is less than a predetermined adjustment threshold; obtain a luminance weight map corresponding to the visible image with adjusted luminance based on an adjusted luminance of each window in the visible image; obtain a luminance weight map corresponding to the infrared image based on the luminance of each window in the infrared image; and generate a fused image based on the low-frequency component of the visible image, the low-frequency component of the infrared image, the luminance weight map corresponding to the visible image with adjusted luminance, and the luminance weight map corresponding to the infrared image.

A further aspect of the present disclosure relates to an image fusion device including at least one processor, a storage communicatively coupled to the at least one processor, and a computer program stored in the storage. When executed by at least one processor, the computer program may direct the at least one processor to perform the method for image fusion.

A still further aspect of the present disclosure relates to a computer readable storage medium storing a computer program thereon. When executed by the at least one processor, the computer program may direct the at least one processor to perform the method for image fusion.

A still further aspect of the present disclosure relates to a system for image processing. The system may include at least one storage medium including a set of instructions and at least one processor in communication with the at least one storage medium. When executing the set of instructions, the at least one processor may be directed to cause the system to obtain low-frequency component of a first image, the low-frequency component of the first image including a luminance of each element of the first image. For each element of the first image, the at least one processor may be directed to cause the system to determine whether the luminance of the element is less than a predetermined luminance threshold and adjust the luminance of the element in response to determining that the luminance of the element is less than the predetermined luminance threshold. The at least one processor may be directed to cause the system further to determine a first luminance weight map corresponding to the low-frequency component of the first image based on the adjusted luminance of each element of the first image. The at least one processor may be directed to cause the system further to obtain low-frequency component of a second image, the low-frequency component of the second image including a luminance of each element of the second image; and determine a second luminance weight map corresponding to the low-frequency component of the second image based on the luminance of each element of the second image. Then the at least one processor may be directed to cause the system to and determine a fused image based on the low-frequency component of the first image, the first luminance weight map, the low-frequency component of the second image, and the second luminance weight map.

In some embodiments, the predetermined luminance threshold may be determined based on a first predetermined maximum weight associated with the low-frequency component of the first image, a predetermined confidence coefficient associated with the first image, and a second predetermined maximum weight associated with the low-frequency component of the second image.

In some embodiments, the first predetermined maximum weight associated with the low-frequency component of the first image or the second predetermined maximum weight associated with the low-frequency component of the second image may be determined by performing a compensation operation on the first image based on a predetermined target luminance; and determining the first predetermined maximum weight associated with the low-frequency component of the first image or the second predetermined maximum weight associated with the low-frequency component of the second image based on a compensation value associated with the compensation operation according to a relationship between compensation value and maximum weight.

In some embodiments, the relationship between compensation value and maximum weight may be determined by obtaining a plurality of first reference images and a plurality of second reference images; for each of the plurality of first reference images, performing a compensation operation on the first reference image based on the predetermined target luminance; determining a reference compensation value corresponding to the compensation operation; determining a reference fused image by fusing the first reference image and each of the plurality of second reference images based on the predetermined target luminance; and identifying a first reference luminance weight corresponding to the first reference image and a second reference luminance weight corresponding to the second reference image in the reference fused image; and determining the relationship between compensation value and maximum weight based on a plurality of reference compensation values, a plurality of first reference luminance weights corresponding to each of the plurality of compensation values, and a plurality of second reference luminance weights corresponding to each of the plurality of compensation values.

In some embodiments, at least one of the first predetermined maximum weight associated with the low-frequency component of the first image, the predetermined confidence coefficient associated with the first image, and/or the second predetermined maximum weight associated with the low-frequency component of the second image may be a default value and/or a user-defined value.

In some embodiments, the predetermined luminance threshold may be determined by obtaining a plurality of first sample images, each of the plurality of first sample images corresponding to a respective one of a plurality of sample fused images; for each of the plurality of first sample images, determining a sample luminance and a sample luminance weight corresponding to the first sample image; determining a luminance-weight function by performing a fitting operation on a plurality of sample luminance values and a plurality of sample luminance weights corresponding to the plurality of first sample images; and determining the predetermined luminance threshold based on the luminance-weight function.

In some embodiments, to determine the first luminance weight map corresponding to the low-frequency component of the first image based on the adjusted luminance of each element of the first image, the at least one processor may be directed to cause the system to: for each element of the first image, determine an initial luminance weight corresponding to the element based on the first predetermined maximum weight associated with the low-frequency component of the first image, the predetermined confidence coefficient associated with the first image, and the adjusted luminance of the element and determine a target luminance weight corresponding to the element by performing an amplitude limiting on the initial luminance weight. Further, the at least one processor may be directed to cause the system to determine the first luminance weight map corresponding to the low-frequency component of the first image based on a plurality of target luminance weights corresponding to a plurality of elements of the first image.

In some embodiments, to determine the second luminance weight map corresponding to the low-frequency component of the second image based on the luminance of each element of the second image, the at least one processor may be directed to cause the system to determine a low-frequency component difference based on the low-frequency component of the first image and the low-frequency component of the second image; and determine the second luminance weight map corresponding to the low-frequency component of the second image based on the second predetermined maximum weight associated with the low-frequency component of the second image and a luminance of each element of the low-frequency component difference.

In some embodiments, to determine the second luminance weight map corresponding to the low-frequency component of the second image based on the luminance of each element of the second image, the at least one processor may be directed to cause the system to determine an adjusted luminance for each element of the low-frequency component difference based on a predetermined coefficient; and determine the second luminance weight map corresponding to the low-frequency component of the second image based on the second predetermined maximum weight associated with the low-frequency component of the second image and the adjusted luminance of each element of the low-frequency component difference.

In some embodiments, to determine the second luminance weight map corresponding to the low-frequency component of the second image based on the luminance of each element of the second image, the at least one processor may be directed to cause the system to obtain a plurality of second sample images, each of the plurality of second sample images corresponding to a respective one of a plurality of sample fused images; for each of the plurality of second sample images, determine a sample luminance and a sample luminance weight corresponding to the second sample image; determine a luminance-weight function by performing a fitting operation on a plurality of sample luminance values and a plurality of sample luminance weights corresponding to the plurality of second sample images; and determine the second luminance weight map corresponding to the low-frequency component of the second image based on the luminance of each element of the second image and the luminance-weight function.

In some embodiments, to determine the fused image based on the low-frequency component of the first image, the first luminance weight map, the low-frequency component of the second image, and the second luminance weight map, the at least one processor may be directed to cause the system to determine a fused luminance weight map based on the first luminance weight map and the second luminance weight map; and determine the fused image based on the low-frequency component of the first image, the low-frequency component of the second image, and the fused luminance weight map.

In some embodiments, the first image may be a visible image and the second image may be an infrared image.

A still further aspect of the present disclosure relates to a method implemented on a computing device including at least one processor, at least one storage medium, and a communication platform connected to a network. The method may include obtaining low-frequency component of a first image, the low-frequency component of the first image including a luminance of each element of the first image, wherein for each element of the first image, determining whether the luminance of the element is less than a predetermined luminance threshold and adjusting the luminance of the element in response to determining that the luminance of the element is less than the predetermined luminance threshold. The method may further include determining a first luminance weight map corresponding to the low-frequency component of the first image based on the adjusted luminance of each element of the first image; obtaining low-frequency component of a second image, the low-frequency component of the second image including a luminance of each element of the second image; determining a second luminance weight map corresponding to the low-frequency component of the second image based on the luminance of each element of the second image; and determining a fused image based on the low-frequency component of the first image, the first luminance weight map, the low-frequency component of the second image, and the second luminance weight map.

In some embodiments, the predetermined luminance threshold may be determined based on a first predetermined maximum weight associated with the low-frequency component of the first image, a predetermined confidence coefficient associated with the first image, and a second predetermined maximum weight associated with the low-frequency component of the second image.

In some embodiments, the first predetermined maximum weight associated with the low-frequency component of the first image or the second predetermined maximum weight associated with the low-frequency component of the second image may be determined by performing a compensation operation on the first image based on a predetermined target luminance; and determining the first predetermined maximum weight associated with the low-frequency component of the first image or the second predetermined maximum weight associated with the low-frequency component of the second image based on a compensation value associated with the compensation operation according to a relationship between compensation value and maximum weight.

In some embodiments, the relationship between compensation value and maximum weight may be determined by obtaining a plurality of first reference images and a plurality of second reference images; for each of the plurality of first reference images, performing a compensation operation on the first reference image based on the predetermined target luminance; determining a reference compensation value corresponding to the compensation operation; determining a reference fused image by fusing the first reference image and each of the plurality of second reference images based on the predetermined target luminance; and identifying a first reference luminance weight corresponding to the first reference image and a second reference luminance weight corresponding to the second reference image in the reference fused image; and determining the relationship between compensation value and maximum weight based on a plurality of reference compensation values, a plurality of first reference luminance weights corresponding to each of the plurality of compensation values, and a plurality of second reference luminance weights corresponding to each of the plurality of compensation values.

In some embodiments, at least one of the first predetermined maximum weight associated with the low-frequency component of the first image, the predetermined confidence coefficient associated with the first image, and/or the second predetermined maximum weight associated with the low-frequency component of the second image may be a default value and/or a user-defined value.

In some embodiments, the predetermined luminance threshold may be determined by obtaining a plurality of first sample images, each of the plurality of first sample images corresponding to a respective one of a plurality of sample fused images; for each of the plurality of first sample images, determining a sample luminance and a sample luminance weight corresponding to the first sample image; determining a luminance-weight function by performing a fitting operation on a plurality of sample luminance values and a plurality of sample luminance weights corresponding to the plurality of first sample images; and determining the predetermined luminance threshold based on the luminance-weight function.

In some embodiments, the determining the first luminance weight map corresponding to the low-frequency component of the first image based on the adjusted luminance of each element of the first image may include: for each element of the first image, determining an initial luminance weight corresponding to the element based on the first predetermined maximum weight associated with the low-frequency component of the first image, the predetermined confidence coefficient associated with the first image, and the adjusted luminance of the element and determining a target luminance weight corresponding to the element by performing an amplitude limiting on the initial luminance weight; and determining the first luminance weight map corresponding to the low-frequency component of the first image based on a plurality of target luminance weights corresponding to a plurality of elements of the first image.

In some embodiments, the determining the second luminance weight map corresponding to the low-frequency component of the second image based on the luminance of each element of the second image may include determining a low-frequency component difference based on the low-frequency component of the first image and the low-frequency component of the second image; and determining the second luminance weight map corresponding to the low-frequency component of the second image based on the second predetermined maximum weight associated with the low-frequency component of the second image and a luminance of each element of the low-frequency component difference.

In some embodiments, the determining the second luminance weight map corresponding to the low-frequency component of the second image based on the luminance of each element of the second image may include determining an adjusted luminance for each element of the low-frequency component difference based on a predetermined coefficient; and determining the second luminance weight map corresponding to the low-frequency component of the second image based on the second predetermined maximum weight associated with the low-frequency component of the second image and the adjusted luminance of each element of the low-frequency component difference.

In some embodiments, the determining the second luminance weight map corresponding to the low-frequency component of the second image based on the luminance of each element of the second image may include obtaining a plurality of second sample images, each of the plurality of second sample images corresponding to a respective one of a plurality of sample fused images; for each of the plurality of second sample images, determining a sample luminance and a sample luminance weight corresponding to the second sample image; determining a luminance-weight function by performing a fitting operation on a plurality of sample luminance values and a plurality of sample luminance weights corresponding to the plurality of second sample images; and determining the second luminance weight map corresponding to the low-frequency component of the second image based on the luminance of each element of the second image and the luminance-weight function.

In some embodiments, the determining the fused image based on the low-frequency component of the first image, the first luminance weight map, the low-frequency component of the second image, and the second luminance weight map may include determining a fused luminance weight map based on the first luminance weight map and the second luminance weight map; and determining the fused image based on the low-frequency component of the first image, the low-frequency component of the second image, and the fused luminance weight map.

In some embodiments, the first image may be a visible image and the second image may be an infrared image.

A still further aspect of the present disclosure relates to a system for image processing. The system may include a first obtaining module, an adjusting module, a first weight map determination module, a second obtaining module, a second weight map determination module, and a fused image determination module. The first obtaining module may be configured to obtain low-frequency component of a first image, the low-frequency component of the first image including a luminance of each element of the first image. The adjusting module may be configured to determine whether the luminance of each element of the first image is less than a predetermined luminance threshold and adjust the luminance of the element in response to determining that the luminance of the element is less than the predetermined luminance threshold. The first weight map determination module may be configured to determine a first luminance weight map corresponding to the low-frequency component of the first image based on the adjusted luminance of each element of the first image. The second obtaining module may be configured to obtain low-frequency component of a second image, the low-frequency component of the second image including a luminance of each element of the second image. The second weight map determination module may be configured to determine a second luminance weight map corresponding to the low-frequency component of the second image based on the luminance of each element of the second image. The fused image determination module may be configured to determine a fused image based on the low-frequency component of the first image, the first luminance weight map, the low-frequency component of the second image, and the second luminance weight map.

In some embodiments, the predetermined luminance threshold may be determined based on a first predetermined maximum weight associated with the low-frequency component of the first image, a predetermined confidence coefficient associated with the first image, and a second predetermined maximum weight associated with the low-frequency component of the second image.

In some embodiments, the first predetermined maximum weight associated with the low-frequency component of the first image or the second predetermined maximum weight associated with the low-frequency component of the second image may be determined by performing a compensation operation on the first image based on a predetermined target luminance; and determining the first predetermined maximum weight associated with the low-frequency component of the first image or the second predetermined maximum weight associated with the low-frequency component of the second image based on a compensation value associated with the compensation operation according to a relationship between compensation value and maximum weight.

In some embodiments, the relationship between compensation value and maximum weight may be determined by obtaining a plurality of first reference images and a plurality of second reference images; for each of the plurality of first reference images, performing a compensation operation on the first reference image based on the predetermined target luminance; determining a reference compensation value corresponding to the compensation operation; determining a reference fused image by fusing the first reference image and each of the plurality of second reference images based on the predetermined target luminance; and identifying a first reference luminance weight corresponding to the first reference image and a second reference luminance weight corresponding to the second reference image in the reference fused image; and determining the relationship between compensation value and maximum weight based on a plurality of reference compensation values, a plurality of first reference luminance weights corresponding to each of the plurality of compensation values, and a plurality of second reference luminance weights corresponding to each of the plurality of compensation values.

In some embodiments, at least one of the first predetermined maximum weight associated with the low-frequency component of the first image, the predetermined confidence coefficient associated with the first image, and/or the second predetermined maximum weight associated with the low-frequency component of the second image may be a default value and/or a user-defined value.

In some embodiments, the predetermined luminance threshold may be determined by obtaining a plurality of first sample images, each of the plurality of first sample images corresponding to a respective one of a plurality of sample fused images; for each of the plurality of first sample images, determining a sample luminance and a sample luminance weight corresponding to the first sample image; determining a luminance-weight function by performing a fitting operation on a plurality of sample luminance values and a plurality of sample luminance weights corresponding to the plurality of first sample images; and determining the predetermined luminance threshold based on the luminance-weight function.

In some embodiments, the first weight map determination module may be configured to, for each element of the first image, determine an initial luminance weight corresponding to the element based on the first predetermined maximum weight associated with the low-frequency component of the first image, the predetermined confidence coefficient associated with the first image, and the adjusted luminance of the element; and determine a target luminance weight corresponding to the element by performing an amplitude limiting on the initial luminance weight. Further, the first weight map determination module may be configured to determine the first luminance weight map corresponding to the low-frequency component of the first image based on a plurality of target luminance weights corresponding to a plurality of elements of the first image.

In some embodiments, the second weight map determination module may be further configured to determine a low-frequency component difference based on the low-frequency component of the first image and the low-frequency component of the second image; and determine the second luminance weight map corresponding to the low-frequency component of the second image based on the second predetermined maximum weight associated with the low-frequency component of the second image and a luminance of each element of the low-frequency component difference.

In some embodiments, the second weight map determination module may be further configured to determine an adjusted luminance for each element of the low-frequency component difference based on a predetermined coefficient; and determine the second luminance weight map corresponding to the low-frequency component of the second image based on the second predetermined maximum weight associated with the low-frequency component of the second image and the adjusted luminance of each element of the low-frequency component difference.

In some embodiments, the second weight map determination module may be further configured to obtain a plurality of second sample images, each of the plurality of second sample images corresponding to a respective one of a plurality of sample fused images; for each of the plurality of second sample images, determine a sample luminance and a sample luminance weight corresponding to the second sample image; determine a luminance-weight function by performing a fitting operation on a plurality of sample luminance values and a plurality of sample luminance weights corresponding to the plurality of second sample images; and determine the second luminance weight map corresponding to the low-frequency component of the second image based on the luminance of each element of the second image and the luminance-weight function.

In some embodiments, the fused image determination module may be further configured to determine a fused luminance weight map based on the first luminance weight map and the second luminance weight map; and determine the fused image based on the low-frequency component of the first image, the low-frequency component of the second image, and the fused luminance weight map.

In some embodiments, the first image may be a visible image and the second image may be an infrared image.

A still further aspect of the present disclosure relates to a non-transitory computer readable medium including executable instructions. When the executable instructions are executed by at least one processor, the executable instructions may direct the at least one processor to perform a method. The method may include obtaining low-frequency component of a first image, the low-frequency component of the first image including a luminance of each element of the first image, wherein for each element of the first image, determining whether the luminance of the element is less than a predetermined luminance threshold and adjusting the luminance of the element in response to determining that the luminance of the element is less than the predetermined luminance threshold; determining a first luminance weight map corresponding to the low-frequency component of the first image based on the adjusted luminance of each element of the first image; obtaining low-frequency component of a second image, the low-frequency component of the second image including a luminance of each element of the second image; determining a second luminance weight map corresponding to the low-frequency component of the second image based on the luminance of each element of the second image; and determining a fused image based on the low-frequency component of the first image, the first luminance weight map, the low-frequency component of the second image, and the second luminance weight map.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 is a flowchart illustrating an exemplary process for image fusion according to some embodiments of the present disclosure;

FIG. 11-B is a schematic diagram illustrating an exemplary multi-layer structure associated with compensation value, first weight corresponding to visible image, and second weight corresponding to infrared image according to some embodiments of the present disclosure;

FIG. 14 is a flowchart illustrating an exemplary process for determining a second luminance weight map according to some embodiments of the present disclosure;

DETAILED DESCRIPTION

Figure 1:
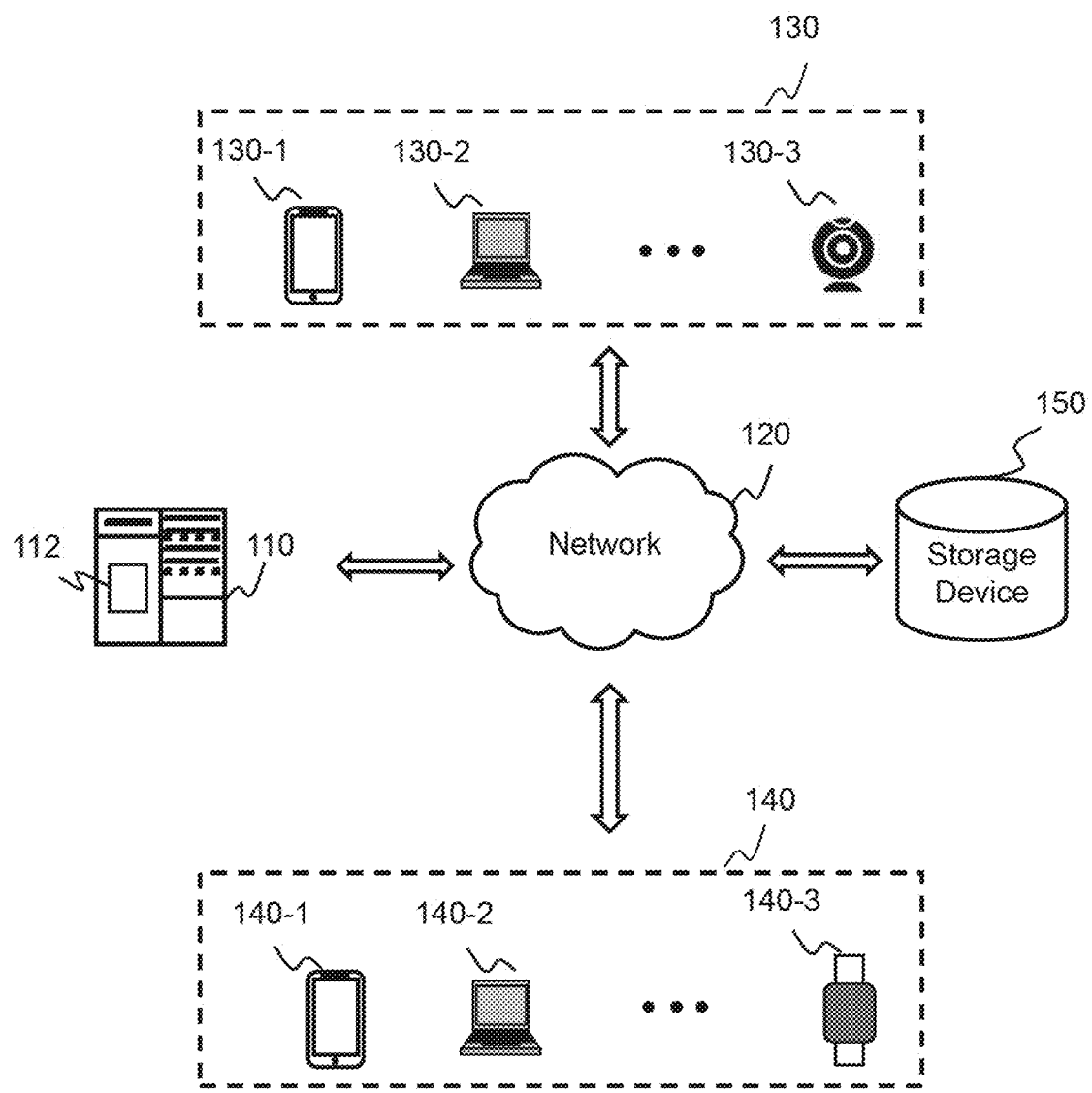
FIG. 1 is a schematic diagram illustrating an exemplary image processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expression if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for image processing (e.g., image fusion). The system may obtain low-frequency component of a first image (e.g., a visible image), the low-frequency component including a luminance of each element (e.g., a window) of the first image. For each element of the first image, the system may determine whether the luminance of the element is less than a predetermined luminance threshold and adjust (e.g., increase) the luminance of the element of response to determining that the luminance of the element is less than the predetermined luminance threshold. Then the system may determine a first luminance weight map corresponding to the low-frequency component of the first image based on the adjusted luminance (or original luminance if not adjusted) of each element of the first image. Further, the system may obtain low-frequency component of a second image (e.g., an infrared image), the low-frequency component including a luminance of each element of the second image. Similarly, the system may determine a second luminance weight map corresponding to the low-frequency component of the second image based on the luminance of each element of the second image. Finally, the system may determine a fused image based on the low-frequency component of the first image, the first luminance weight map, the low-frequency component of the second image, and the second luminance weight map.

According to the systems and methods of the present disclosure, for elements with luminance values less than the predetermined luminance threshold in a first image, the luminance values of the elements may be increased. Also, a first luminance weight map (which includes a plurality of weights corresponding to a plurality of elements in the first image) corresponding to the first image (with luminance adjusted) and a second luminance weight map (which includes a plurality of weights corresponding to a plurality of elements in the second image) may be determined. Accordingly, different elements in the two images correspond to different weights, thereby avoiding a luminance reversal in a fused image determined based on the first image and the second image and improving the quality of the fused image.

FIG. 1 is a schematic diagram illustrating an exemplary image processing system according to some embodiments of the present disclosure. As shown, the image processing system 100 may include a server 110, a network 120, an acquisition device 130, a user device 140, and a storage device 150. In some embodiments, the image processing system 100 may be applied in various fields, for example, security monitoring (e.g., building monitoring), environment monitoring (e.g., forest fire monitoring), etc.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130, the user device 140, and/or the storage device 150 via the network 120. As another example, the server 110 may be directly connected to the acquisition device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to image processing to perform one or more functions described in the present disclosure. For example, the processing device 112 may determine low-frequency component of a first image (e.g., a visible image) and low-frequency component of a second image (e.g., an infrared image). The processing device 112 may also determine a first luminance weight map corresponding to the low-frequency component of the first image and a second luminance weight map corresponding to the low-frequency component of the second image. Further, the processing device 112 may determine a fused image based on the low-frequency component of the first image, the first luminance weight map, the low-frequency component of the second image, and the second luminance weight map. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the acquisition device 130, the user device 140) of the image processing system 100. For example, the processing device 112 may be integrated in the acquisition device 130 or the user device 140 and the functions (e.g., determining a fused image) of the processing device 112 may be implemented by the acquisition device 130 or the user device 140.

The network 120 may facilitate exchange of information and/or data for the image processing system 100. In some embodiments, one or more components (e.g., the server 110, the acquisition device 130, the user device 140, the storage device 150) of the image processing system 100 may transmit information and/or data to other component(s) of the image processing system 100 via the network 120. For example, the server 110 may obtain a first image (e.g., a visible image) and a second image (e.g., an infrared image) from the acquisition device 130 via the network 120. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The acquisition device 130 may be configured to acquire an image (the "image" herein refers to a single image or a frame of a video). In some embodiments, the acquisition device 130 may include a mobile device 130-1, a computer 130-2, a camera device 130-3, etc. The mobile device 130-1 may include a smart home device, a smart mobile phone, or the like, or any combination thereof. The computer 130-2 may include a laptop, a tablet computer, a desktop, or the like, or any combination thereof. The camera device 130-3 may include a gun camera, a dome camera, an integrated camera, a monocular camera, a binocular camera, a multi-view camera, or the like, or any combination thereof. The image acquired by the acquisition device 130 may be a two-dimensional image, a three-dimensional image, a four-dimensional image, etc. In some embodiments, the acquisition device 130 may include a plurality of components each of which can acquire an image. For example, the acquisition device 130 may include a plurality of sub-cameras that can take pictures or videos simultaneously. In some embodiments, the acquisition device 130 may transmit the acquired image to one or more components (e.g., the server 110, the user device 140, the storage device 150) of the image processing system 100 via the network 120.

The user device 140 may be configured to receive information and/or data from the server 110, the acquisition device 130, and/or the storage device 150 via the network 120. For example, the user device 140 may receive information associated with a fused image from the server 110. In some embodiments, the user device 140 may provide a user interface via which a user may view information and/or input data and/or instructions to the image processing system 100. For example, the user may view a fused image obtained from the server 110 via the user interface. As another example, the user may input an instruction associated with an image processing parameter via the user interface. In some embodiments, the user device 140 may include a mobile phone 140-1, a computer 140-2, a wearable device 140-3, etc. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the user device 140 may be connected to one or more components (e.g., the server 110, the acquisition device 130, the storage device 150) of the image processing system 100 via the network 120.

The storage device 150 may be configured to store data and/or instructions. The data and/or instructions may be obtained from, for example, the server 110, the acquisition device 130, and/or any other component of the image processing system 100. In some embodiments, the storage device 150 may store data and/or instructions that the server 110 may execute or use to perform exemplary methods described in the present disclosure. For example, the storage device 150 may store a first image and a second image acquired by the acquisition device 130 or any information (e.g., low-frequency component, elements) associated with the images. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the acquisition device 130, the user device 140) of the image processing system 100. One or more components of the image processing system 100 may access the data or instructions stored in the storage device 150 via the network 120. In some embodiments, the storage device 150 may be directly connected to or communicate with one or more components (e.g., the server 110, the acquisition device 130, the user device 140) of the image processing system 100. In some embodiments, the storage device 150 may be part of other components of the image processing system 100, such as the server 110, the acquisition device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
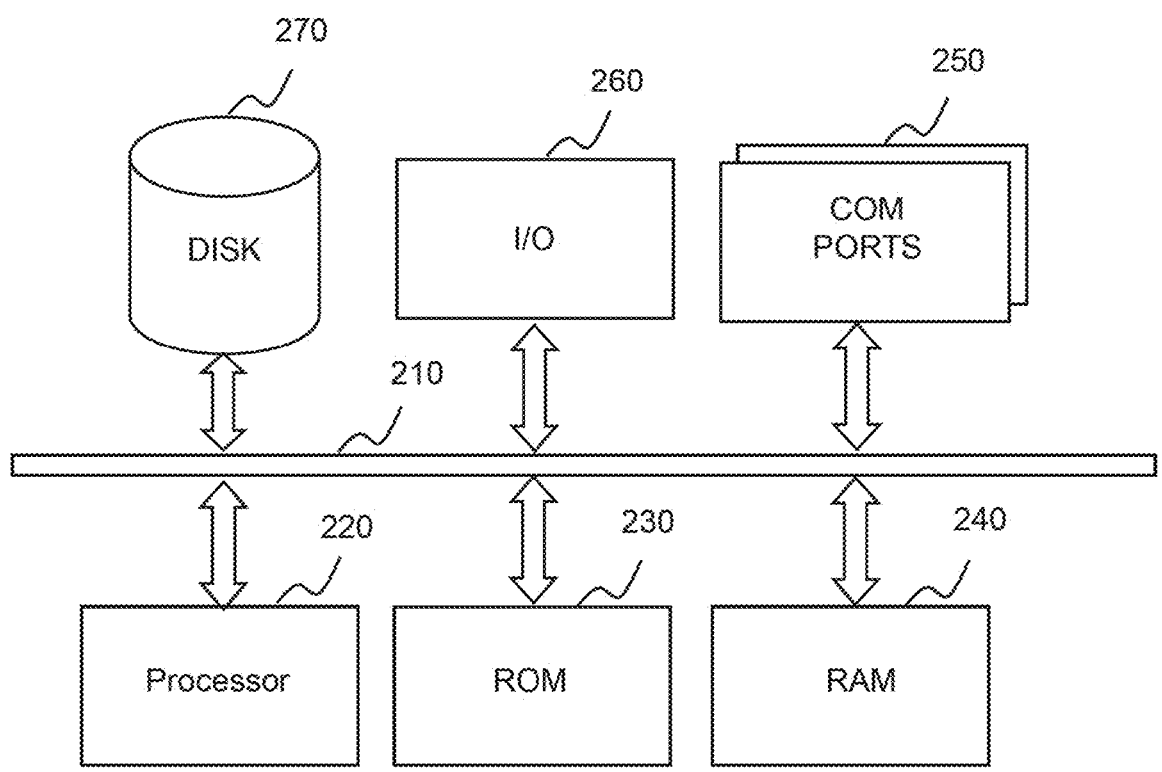
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the image processing system 100 as described herein. For example, the processing device 112 may be implemented on the computing device 200, via its hardware, software program, firmware, or a combination thereof. Although only one such computer is shown, for convenience, the computer functions relating to image processing as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
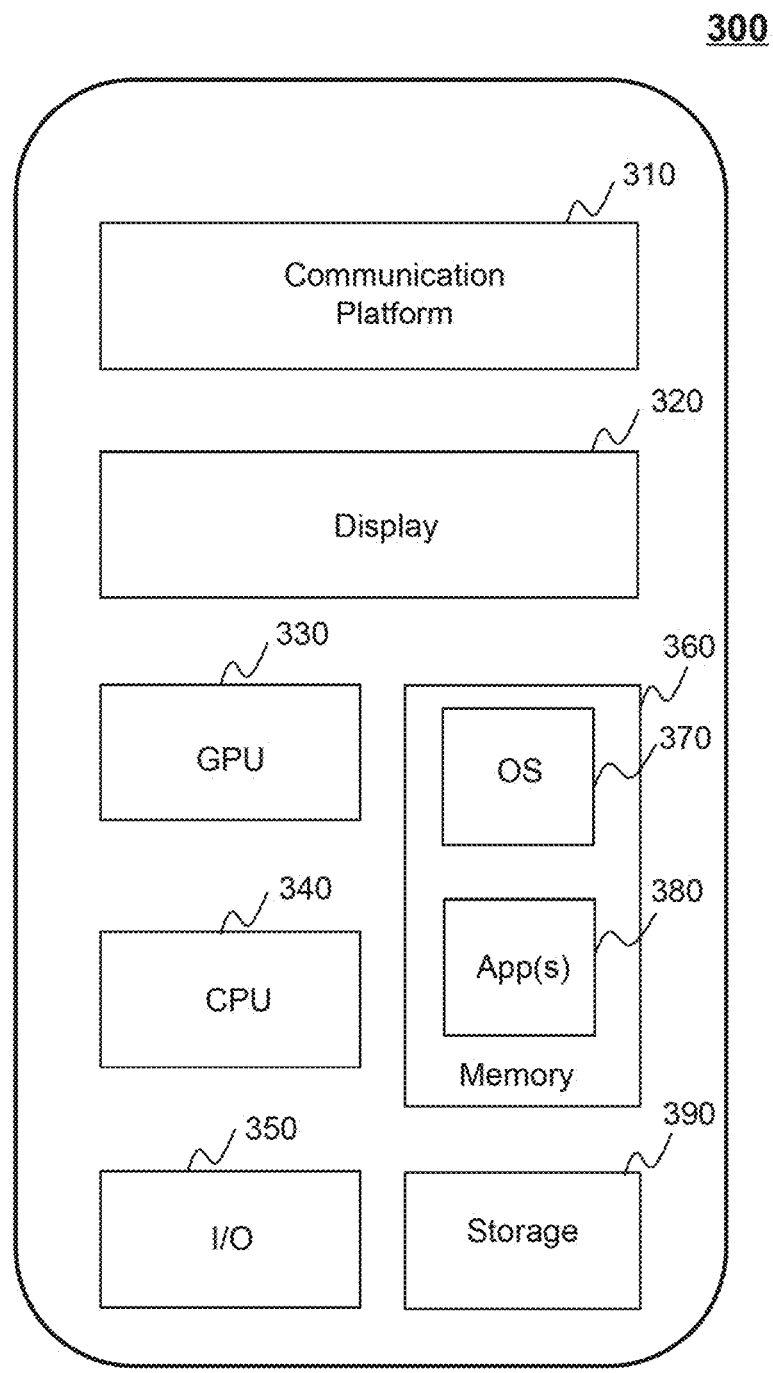
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the user device 140 may be implemented on the terminal device 300 shown in FIG. 3.

As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image processing or other information from the processing device 112. User interactions may be achieved via the I/O 350 and provided to the processing device 112 and/or other components of the image processing system 100 via the network 120.

FIG. 4 is a flowchart illustrating an exemplary process for image fusion according to some embodiments of the present disclosure. In some embodiments, the process 400 may be implemented as a set of instructions (e.g., an application) stored in the storage ROM 230 or RAM 240. The processor 220 and/or the modules in FIG. 7 or FIG. 8 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations herein discussed. Additionally, the order in which the operations of the process as illustrated in FIG. 4 and described below is not intended to be limiting.

In 401, low-frequency component of a visible image (also referred to as "visible light image" or "first image") and low-frequency component of an infrared image (also referred to as "infrared light image" or "second image") may be obtained. In some embodiments, the low-frequency component of the visible image and the low-frequency component of the infrared image may be obtained by an image fusion device (e.g., an obtaining module 701 in an image fusion device 700 illustrated in FIG. 7) or the processor 220.

In some embodiments, the low-frequency component of the visible image may include a luminance of each window (also referred to as "element") in the visible image. The low-frequency component of the infrared image may include a luminance of each window in the infrared image. As used herein, the window may refer to a smallest image processing unit. It should be noted that a size of the window is not intended to be limiting, which may be a default setting of the image processing system 100 or may be adjustable under different situations. For example, the size of the window may be a pixel, 3 pixels*3 pixels, 5 pixels*5 pixels, 10 pixels*10 pixels, etc.

In 402, if the luminance of any window in the visible image is less than a predetermined adjustment threshold (also referred to as "predetermined luminance threshold"), the luminance of the window may be adjusted (e.g., increased). In some embodiments, the luminance of the window may be adjusted by the image fusion device (e.g., a processing module 702 in the image fusion device 700) or the processor 220.

In 403, a luminance weight map (also referred to as a "first luminance weight map") corresponding to the visible image with adjusted luminance may be obtained based on an adjusted luminance (or original luminance if not adjusted) of each window in the visible image and a luminance weight map (also referred to as a "second luminance weight map") corresponding to the infrared image may be obtained based on the luminance of each window in the infrared image. In some embodiments, the luminance weight map corresponding to the visible image with adjusted luminance and the luminance weight map corresponding to the infrared image may be obtained by the image fusion device (e.g., the processing module 702) or the processor 220.

As used herein, the luminance weight map corresponding to the visible image with adjusted luminance can be understood as an arrangement including a plurality of luminance weights corresponding to a plurality of windows in the visible image with adjusted luminance in the order of the windows. Similarly, the luminance weight map corresponding to the infrared image can be understood as an arrangement including a plurality of luminance weights corresponding to a plurality of windows in the infrared image in the order of the windows.

In 404, a fused image may be generated based on the low-frequency component of the visible image, the low-frequency component of the infrared image, the luminance weight map corresponding to the visible image with adjusted luminance, and the luminance weight map corresponding to the infrared image. In some embodiments, the fused image may be generated by the image fusion device (e.g., the processing module 702) or the processor 220.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 5:
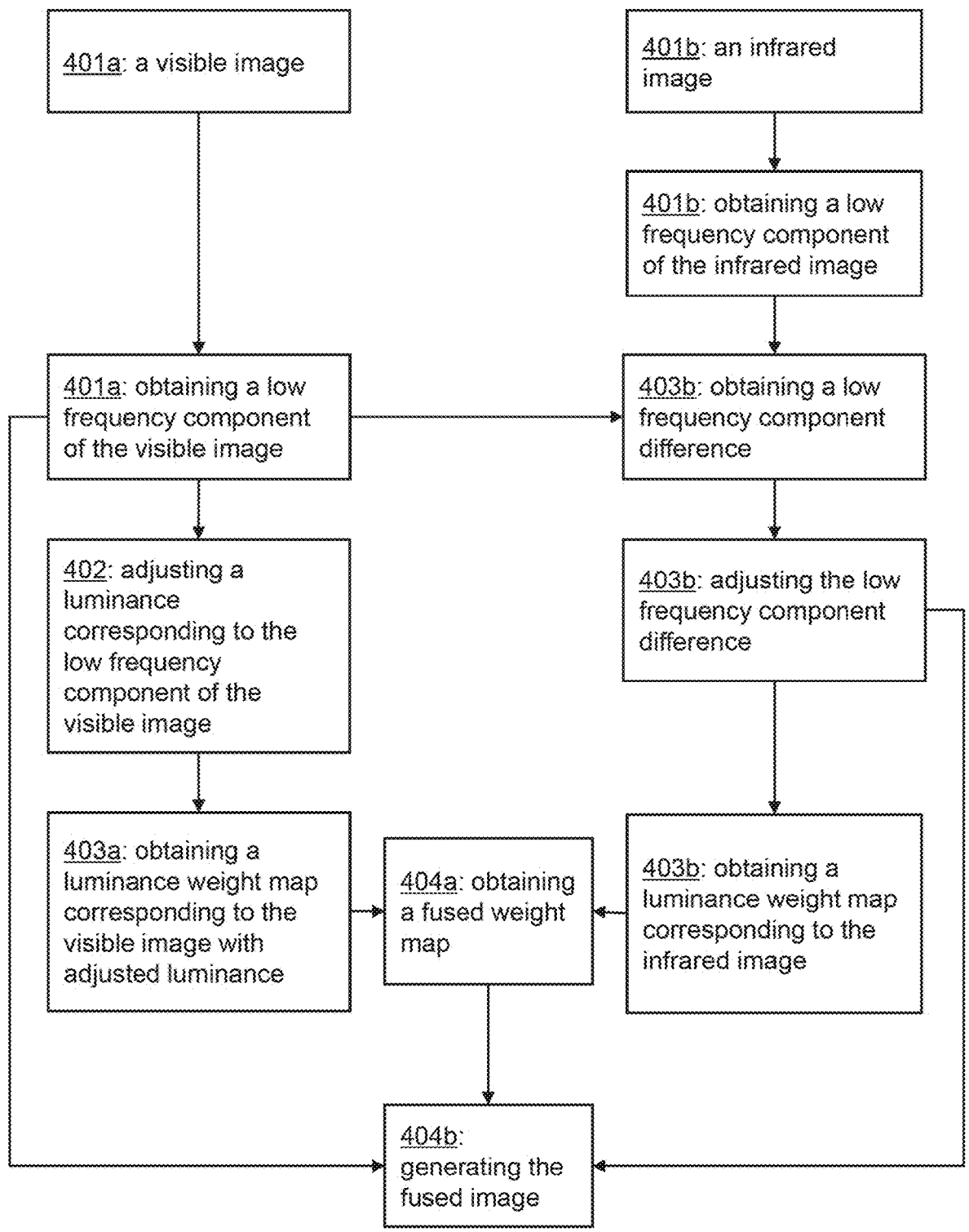
FIG. 5 is a schematic diagram illustrating an exemplary process for image fusion according to some embodiments of the present disclosure.

FIG. 5 is a schematic diagram illustrating an exemplary process for image fusion according to some embodiments of the present disclosure.

As described in connection with FIG. 4, operation 401 may include a sub-operation 401a in which low-frequency component of a visible image may be obtained and a sub-operation 401b in which low-frequency component of an infrared image may be obtained. The low-frequency component of the visible image may include a luminance of each window in the visible image. The low-frequency component of the infrared image may include a luminance of each window in the infrared image. In some embodiments, sub-operation 401a and/or sub-operation 401b may be performed in various ways.

In some embodiments, an image fusion device (e.g., an image fusion device 700) may perform a low-pass filtering on the visible image and obtain the low-frequency component of the visible image. Also, the image fusion device may perform a low-pass filtering on the infrared image and obtain the low-frequency component of the infrared image.

Specifically, the image fusion device may obtain the visible image and the infrared image by directly collecting the visible image and the infrared image or receiving the visible image and the infrared image from the acquisition device 130, the user device 140, and/or the storage device 150. Further, after obtaining the visible image and the infrared image, the image fusion device may perform a low-pass filtering on the visible image to obtain the low-frequency component of the visible image and perform a low-pass filtering on the infrared image to obtain the low-frequency component of the infrared image.

As used herein, the low-pass filtering may be a multi-layer low-pass filtering and may include a pyramid transformation. The pyramid transformation may include at least one operation, such as a low-pass filtering, an up-sampling, a down-sampling, a band-pass filtering, or the like, or any combination thereof. After the pyramid transformation is performed on an image, a low-frequency component and/or a high frequency component of an image (e.g., the visible image, the infrared image) may be obtained.

In some embodiments, the image fusion device may convert the visible image into a luminance-chrominance separation color space and obtain the low-frequency component (which includes luminance information of the visible image) of the visible image. Also, the image fusion device may convert the infrared image into the luminance-chrominance separation color space and obtain the low-frequency component (which includes luminance information of the infrared image) of the infrared image.

Specifically, the image fusion device may obtain low-frequency component of an image (e.g., the visible image, the infrared image) by converting image information in the image based on a predetermined luminance-chrominance separation color space algorithm.

As used herein, the luminance-chrominance separation color space algorithm may include an rgb2yuv conversion formula, which can be used to convert RGB (Red, Green, Blue) information in an image to YUV (Luminance, Chrominance) information, thereby realizing the separation of luminance and chrominance. Take a specific window in an image as an example, the rgb2yuv conversion formula can be expressed as formula (1) below:

$$\begin{cases} Y' = 0.299*R' + 0.587*G' + 0.114*B' \\ U' = 0.147*R' - 0.289*G' + 0.436*B' = 0.492*(B' - Y') \\ V' = 0.615*R' - 0.515*G' - 0.100*B' = 0.877*(R' - Y') \end{cases} \quad (1)$$

where R' refers to an R value corresponding to the window in the image, G' refers to a G value corresponding to the window in the image, B' refers to B value corresponding to the window in the image, Y' refers to a luminance of the window in the image, and U' and V' refers to a chrominance of the window in the image.

In some embodiments, the image fusion device may obtain the low-frequency component of the visible image and the low-frequency component of the infrared image through other devices.

Specifically, the other device may be a device which can communicate with the image fusion device and perform a preprocessing operation on an image. The other device may obtain the low-frequency component of the visible image by processing the visible image and obtain the low-frequency component of the infrared image by processing the infrared image. Further, the other device may transmit the low-frequency component of the visible image and the low-frequency component of the infrared image to the image fusion device.

After obtaining the low-frequency component of the visible image and the low-frequency component of the infrared image, as described in connection with operation 402, in response to determining that the luminance of any window is lower than the predetermined adjustment threshold, the image fusion device may increase the luminance of the window; in response to determining that the luminance of any window in the visible image is higher than or equal to the predetermined adjustment threshold, the image fusion device may not change the luminance of the window. Accordingly, the image fusion device may obtain an adjusted luminance of each window in the visible image. It should be noted that not luminance of every window in the visible image is adjusted (for the window(s) with luminance larger than or equal to the predetermined adjustment threshold, the luminance value(s) of the window(s) remain(s) unchanged), therefore, the "adjusted luminance of each window" refers to adjusted luminance of some windows and original luminance of the other windows.

In some embodiments, the luminance of the window may be increased in various ways.

In some embodiments, the luminance of the window may be set as the predetermined adjustment threshold.

Specifically, in response to determining that the luminance of a specific window in the visible image is lower than the predetermined adjustment threshold, the image fusion device may set the luminance of the window as the predetermined adjustment threshold.

In some embodiments, the luminance of the window may be increased by a predetermined value.

Specifically, in response to determining that the luminance of a specific window in the visible image is less than the predetermined adjustment threshold, the image fusion device may increase the luminance of the window by a predetermined value, which may be a value pre-stored by the image fusion device or a user-defined value.

In some embodiments, the predetermined adjustment threshold may be a predetermined reference value. For example, the predetermined adjustment threshold may be set as a global luminance of a visible image or a luminance value of one or more windows in a visible image, which corresponds to a highest probability when a luminance reversal may occur in a fused image obtained based on the visible image and an infrared image. In general, for image fusion, a luminance weight (e.g., a global luminance weight corresponding to the visible image, a luminance weight corresponding to each window in the visible image (which can be expressed as a luminance weight map)) of a visible image is positively correlated with a luminance (e.g., a global luminance of the visible image, a luminance of each window in the visible image) of the visible image. However, when the luminance of the visible image is less than a certain value, the luminance weight corresponding to the visible image may be not positively correlated with the luminance of the visible image, which is called the "luminance reversal."

In some embodiments, as described above, before adjusting the luminance of the visible image, the image fusion device may determine the predetermined adjustment threshold in various ways.

In some embodiments, the image fusion device may obtain the predetermined adjustment threshold based on a user input.

Specifically, the image fusion device may include an input unit and a user may directly input the predetermined adjustment threshold via the input unit. Further, the image fusion device may obtain the predetermined adjustment threshold based on the user input.

In some embodiments, the image fusion device may obtain the predetermined adjustment threshold based on a default adjustment threshold.

Specifically, the image fusion device may directly select one of a plurality of default adjustment thresholds pre-stored in the image fusion device as the predetermined adjustment threshold.

In some embodiments, the image fusion device may obtain the predetermined adjustment threshold based on a predetermined maximum weight associated with the visible image (also referred to as "first predetermined maximum weight associated with low-frequency component of the visible image"), a predetermined luminance confidence (also referred to as "predetermined confidence coefficient") (e.g., a luminance value or a luminance value range) associated with the visible image, and/or a predetermined maximum weight associated with the infrared image (also referred to as "second predetermined maximum weight associated with low-frequency component of the infrared image"). As used herein, the maximum weight associated with the visible image may be understood as a luminance weight corresponding to the visible image in a fused image obtained by fusing the visible image and the infrared image when the luminance of the fused image reaches a predetermined target luminance; similarly, the maximum weight associated with the infrared image may be understood as a luminance weight corresponding to the infrared image in the fused image when the luminance of the fused image reaches the predetermined target luminance.

In some embodiments, one or more of the predetermined maximum weight associated with the visible image, the predetermined luminance confidence associated with the visible image, or the predetermined maximum weight associated with the infrared image may be default values of the image processing system 100 or user-defined values. For example, the predetermined maximum weight associated with the visible image and the predetermined luminance confidence associated with the visible image may be default values or user-defined values, and the predetermined maximum weight associated with the infrared image may be obtained based on a pre-fusion operation performed on the visible image. As another example, the predetermined luminance confidence associated with the visible image and the predetermined maximum weight associated with the infrared image may be default values or user-defined values, and the predetermined maximum weight associated with the visible image may be obtained based on the pre-fusion operation performed on the visible image. In some embodiments, one or more of the predetermined maximum weight associated with the visible image, the predetermined luminance confidence associated with the visible image, or the predetermined maximum weight associated with the infrared image may be determined based on a machine learning model.

Specifically, the image fusion device may perform a compensation operation on the visible image until a luminance (e.g., a global luminance, a luminance of each window) of the compensated visible image reaches a predetermined target luminance and obtain a compensation value based on the compensation operation. As used herein, the compensation operation may be understood as an operation for performing a gain on the visible image. Further, the image fusion device may obtain the predetermined maximum weight associated with the visible image or the predetermined maximum weight associated with the infrared image based on the compensation value according to a relationship (e.g., a relationship among compensation value, luminance weight corresponding to visible image, and luminance weight corresponding to infrared image) between compensation value and maximum weight (e.g., the larger the compensation value is, the larger the maximum weight may be).

In some embodiments, the relationship between the compensation value and the maximum weight may include at least one of a first relationship between the compensation value and the predetermined maximum weight associated with the visible image or a second relationship between the compensation value and the predetermined maximum weight associated with the infrared image.

In some embodiments, the image fusion device may obtain a plurality of reference visible images (also referred to as "first reference images") and a reference infrared image (also referred to as "second reference image") (e.g., the predetermined infrared image). For each of the plurality of reference visible images, the image fusion device may perform a compensation operation on the reference visible image until a luminance (e.g., a global luminance, a luminance of each window) of the compensated reference visible image reaches the predetermined target luminance and obtain a reference compensation value based on the compensation operation. The image fusion device may also determine a reference fused image by fusing the reference visible image and the reference infrared image based on the predetermined target luminance. For example, the image fusion device may make a luminance (e.g., a global luminance, a luminance of each window) of the reference fused image reaches the predetermined target luminance by adjusting a reference luminance weight (e.g., a global reference luminance weight, a reference luminance weight corresponding to each window) corresponding to the reference visible image and a reference luminance weight (e.g., a global reference luminance weight, a reference luminance weight corresponding to each window) corresponding to the reference infrared image during the fusion process. Then the image fusion device may identify a final reference luminance weight corresponding to the reference visible image a final reference luminance weight corresponding to the reference infrared image when the luminance of the reference fused image reaches the predetermined target luminance. Further, the image fusion device may determine the first relationship based on the plurality of reference compensation values and a plurality of reference luminance weights corresponding to the reference visible images; similarly, the image fusion device may also determine the second relationship based on the plurality of reference compensation values and a plurality of reference luminance weights corresponding to the reference infrared image.

In some embodiments, the image fusion device may obtain a plurality of reference visible images and a plurality of reference infrared images. For each of the plurality of visible images, the image fusion device may perform a compensation operation on the reference visible image until a luminance (e.g., a global luminance, a luminance of each window) of the compensated reference visible image reaches the predetermined target luminance and obtain a reference compensation value based on the compensation operation. The image fusion device may determine a reference fused image by fusing the reference visible image and each of the plurality of reference infrared images based on the predetermined target luminance. For example, the image fusion device may make a luminance (e.g., a global luminance, a luminance of each window) of the reference fused image reach the predetermined target luminance by adjusting a reference luminance weight (e.g., a global reference luminance weight, a reference luminance weight corresponding to each window) corresponding to the reference visible image and a reference luminance weight (e.g., a global reference luminance weight, a reference luminance weight corresponding to each window) corresponding to each of the plurality of reference infrared images during the fusion process. Then the image fusion device may identify a final reference luminance weight corresponding to the reference visible image and a final reference luminance weight corresponding to each of the plurality of reference infrared images when the luminance of the reference fused image reaches the predetermined target luminance. Further, for each of the plurality of reference visible images (since each of the plurality of reference visible images corresponds to a corresponding compensation value, it can be understood as "for each of a plurality of compensation values"), the image fusion device may determine a relationship between luminance weight corresponding to visible image and luminance weight corresponding to infrared image. That is, the image fusion device can determine a relationship among compensation value, luminance weight corresponding to visible image, and luminance weight corresponding to infrared image.

After obtaining the maximum weight associated with the visible image, the predetermined luminance confidence associated with the visible image, and/or the maximum weight associated with the infrared image, the image fusion device may obtain the predetermined adjustment threshold in various ways.

In some embodiments, the image fusion device may obtain the predetermined adjustment threshold according to formula (2) below:

$$adjustThr = -\frac{\left(visValidLuma * \left(\frac{difLimit}{2^n - 1} - \sqrt{\frac{difLimit * visLimit}{visValidLuma}}\right)\right)}{visLimit} + 1 \quad (2)$$

where adjustThr refers to the predetermined adjustment threshold, visValidLuma refers to the predetermined luminance confidence associated with the visible image, difLimit refers to the maximum weight associated with the infrared image, visLimit refers to the maximum weight associated with the visible image, and n refers to a bit width of the visible image.

In some embodiments, the image fusion device may determine the predetermined adjustment threshold based on a plurality of sample visible images (also referred to as "first sample images"). Each of the plurality of sample visible images may correspond to a respective one of a plurality of sample fused images. For each of the plurality of sample visible images, the image fusion device may determine a sample luminance (e.g., a sample global luminance, a sample luminance of each window) and a sample luminance weight (e.g., a sample global luminance weight, a sample luminance weight corresponding to each window) corresponding to the sample visible image in a corresponding fused image. Further, the image fusion device may determine a luminance-weight function by performing a fitting operation on a plurality of sample luminance values and a plurality of sample luminance weights corresponding to the plurality of sample visible images, wherein the luminance-weight function is a monotonically increasing function. The image fusion device may further determine the predetermined adjustment threshold by performing a derivative operation on the luminance-weight function.

In some embodiments, the image fusion device may determine a monotonic function between the luminance and the luminance weight corresponding to the visible image. As used herein, the monotonic function may be any monotonically increasing function under which the luminance weight corresponding to the visible image increases with the luminance of the visible image in a two-dimensional space within a range [0, vislimit]. Further, the image fusion device may obtain a fused weight function under a limit case based on the monotonic function and the predetermined maximum weight associated with the infrared image. Finally, the image fusion device may further determine the predetermined adjustment threshold by performing a derivative operation on the fused weight function. The predetermined adjustment threshold may be a value corresponding to an inflection point (i.e., a critical luminance value indicating the luminance reversal) at which the derivative of the fused weight function begins to reverse.

It should be noted that the above examples for obtaining the predetermined adjustment threshold are provided for illustration purposes and not intended to be limiting. The predetermined adjustment threshold may be obtained in various ways. For example, the formula (2) may be obtained based on a process similar to the process for determining the luminance-weight function or the monotonically increasing function between the luminance and the luminance weight corresponding to the visible image.

After obtaining the adjusted luminance of each window in the visible image, the image fusion device may perform operation 403. In some embodiments, as illustrated in FIG. 5, operation 403 may include a sub-operation 403a in which the luminance weight map corresponding to the visible image may be obtained and a sub-operation 403b in which the luminance weight corresponding to the infrared image may be obtained.

In 403a, the image fusion device may obtain the luminance weight map corresponding to the visible image with adjusted luminance based on the adjusted luminance of each window in the visible image.

In some embodiments, the image fusion device may obtain an initial luminance weight corresponding to each window in the visible image based on the predetermined maximum weight associated with the visible image, the predetermined luminance confidence associated with the visible image, and the adjusted luminance of each window in the visible image. Further, the image fusion device may obtain the luminance weight map corresponding to the visible image with adjusted luminance by performing an amplitude limiting on the initial luminance weight corresponding to each window in the visible image based on the predetermined maximum weight associated with the visible image.

Specifically, take a specific window in the visible image as an example, the image fusion device may obtain the initial luminance weight corresponding to the specific window in the visible image according to formula (3) below:

$$vis'weight = \frac{VL' * visLimit}{visValidluma} \quad (3)$$

where vis'weight refers to the initial luminance weight corresponding to the specific window, VL' refers to the adjusted luminance (or original luminance if not adjusted) of the specific window, visLimit refers to the maximum weight associated with the visible image, and visValidluma refers to the predetermined luminance confidence associated with the visible image.

Further, also take the specific window in the visible image as an example, the image fusion device may perform an amplitude limiting on the initial luminance weight corresponding to the specific window in the visible image according to formula (4) below:

$$visWeight = \text{clip}\left(\frac{VL' * visLimit}{visValidluma}, 0, visLimit\right) \quad (4)$$

where $$\text{clip}\left(\frac{VL' * visLimit}{visValidluma}, 0, visLimit\right)$$

refers to the amplitude limiting performed on $$\frac{VL' * visLimit}{visValidluma}$$

with a lower lima as 0 and an upper limit as visLimit, VL' refers to the adjusted luminance (or original luminance if not adjusted) of the specific window in the visible image, and visWeight refers to the luminance weight corresponding to the specific window.

In 403b, the image fusion device may obtain the luminance weight map corresponding to the infrared image based on the luminance of each window in the infrared image.

In some embodiments, the image fusion device may obtain low-frequency component difference corresponding to each window based on the low-frequency component of each window in the infrared image and the low-frequency component of each window in the visible image. Further, the image fusion device may obtain an adjusted low-frequency component difference by processing the low-frequency component difference based on a predetermined first weight (also referred to as "predetermined coefficient"). According to the adjusted low-frequency component difference and the predetermined maximum weight associated with the infrared image, the image fusion device may obtain the luminance weight map corresponding to the infrared image.

Specifically, the image fusion device may obtain the low-frequency component difference according to formula (5) below:

$$dif = NL - VL \quad (5)$$

where dif refers to the low-frequency component difference, NL refers to the low-frequency component of the infrared image, and VL refers to the low-frequency component of the visible image.

After obtaining the low-frequency component difference, the image fusion device may obtain the adjusted low-frequency component difference according to formula (6) below:

$$\begin{cases} adjustdif = difDark * k \\ adjustdif = diflight \end{cases} \quad (6)$$

where adjustdif refers to the adjusted low-frequency component difference, k refers to the predetermined first weight within a range [0,1], difDark refers to a portion of the low-frequency component difference that is less than 0, and difLight refers to a portion of the low-frequency component difference that is higher than 0. It can be seen that when the low-frequency component difference of a specific window is less than 0, the image fusion device may obtain the adjusted low-frequency component difference of the specific window by multiplying the low-frequency component difference of the specific window by the predetermined first weight. When the low-frequency component difference of the specific window is higher than 0, the image fusion device may directly use the original low-frequency component difference of the specific window as the adjusted low-frequency component of the specific window.

In some embodiments, a value of k may be set by the user. The user can flexibly control a ratio of infrared image to visible image in the fused image by setting the value of k. In some embodiments, the value of k may be set by the image fusion device based on a predetermined rule. For example, when the luminance (e.g., a global luminance, an luminance of each window) of the visible image is relatively large or a proportion of the visible image ("visible image" is used here for brevity, image information of the visible image in fact) in the fused image is relatively high, the image fusion device may set the value of k to tend to 0; when the luminance of the visible image is relatively small or the proportion of the visible image in the fused image is relatively low, the image fusion device may set the value of k to tend to 1.

After obtaining the adjusted low-frequency component difference, the image fusion device may obtain the luminance weight map corresponding to the infrared image in various ways.

In some embodiments, take a specific window in the infrared image as an example, the image fusion device may obtain a luminance weight corresponding to the specific window in the infrared image according to formula (7) below:

$$nirWeight = \begin{cases} \frac{\sqrt{1-\left(\frac{absDif}{2^m-1}-1\right)^2}}{absDif} * difLimit, absDif > 0 \\ 1, absDif \end{cases} \quad (7)$$

where nirWeight refers to the luminance weight corresponding to the specific window in the infrared image, m refers to a bit width of the infrared image, difLimit refers to the maximum weight associated with the infrared image, and absDif refers to an absolute value of the adjusted low-frequency component difference corresponding to the specific window. In some embodiments, the bit width m of the infrared image and the bit width n of the visible image may be same or different.

In some embodiments, the image fusion device may determine the luminance weight map corresponding to the infrared image based on a plurality of sample infrared images (also referred to as "second sample images"). Each of the plurality of sample infrared images may correspond to a respective one of a plurality of sample fused images. For each of the plurality of sample infrared images, the image fusion device may determine a sample luminance (e.g., a sample global luminance, a sample luminance of each window) and a sample luminance weight (e.g., a sample global luminance weight, a sample luminance weight corresponding to each window) corresponding to the sample infrared image in a corresponding fused image. Further, the image fusion device may determine a luminance-weight function (also referred to as "fitting function") by performing a fitting operation on a plurality of sample luminance values and a plurality of sample luminance weights corresponding to the plurality of sample infrared image. The image fusion device may further determine the luminance weight map corresponding to the infrared image based on the luminance of each window in the infrared image and the luminance-weight function.

In some embodiments, the image fusion device may determine a monotonic function between the low-frequency component difference and the luminance weight corresponding to the infrared image. As used herein, the monotonic function may be any monotonically increasing function under which the luminance weight corresponding to the infrared image increases with the low-frequency component difference in a two-dimensional space within a range [0, 1]. Further, the image fusion device may determine the luminance weight map corresponding to the infrared image based on the monotonic function and the low-frequency component difference.

It should be noted that the above examples for obtaining the luminance weight map corresponding to the infrared image are provided for illustration purposes and not intended to be limiting. For example, the formula (7) may be obtained based on a process for determining the luminance-weight function or the monotonically increasing function between the low-frequency component difference and the luminance weight corresponding to the infrared image.

After determining the luminance weight map corresponding to the visible image with adjusted luminance and a luminance weight map corresponding to the infrared image, the image fusion device may perform operation 404. In some embodiments, as illustrated in FIG. 5, operation 404 may include a sub-operation 404a in which the fused weight map may be obtained and a sub-operation 404b in which the fused image may be obtained based on the fused weight map, the low-frequency component of the visible image, and the low-frequency component of the infrared image.

In 404a, the image fusion device may obtain the fused weight map based on the luminance weight map corresponding to the visible image with adjusted luminance and the luminance weight map corresponding to the infrared image.

In some embodiments, take a specific window as an example, the image fusion device may obtain a fused weight corresponding to the specific window according to formula (8) below:

$$difAlpha = \frac{nirWeight}{nirWeight + visWeight} \quad (8)$$

where difAlpha refers to the fused weight corresponding to the specific window in the fused image, nirWeight refers to the luminance weight corresponding to the specific window in the infrared image, and visWeight refers to the luminance weight corresponding to the specific window in the visible image with adjusted luminance.

According to the formula (8), for a region with relatively low luminance in the visible image, the image fusion device may increase the luminance of the region in the fused image based on the luminance of the infrared image according to a predetermined scale. As the luminance of the region is increased, the image fusion device can continuously reduce an increasing degree by reducing a proportion of the luminance of the infrared image in the fused image, which can only increase the luminance of a region with relatively low luminance in the fused image and reduce an influence on a region with relatively high luminance in the fused image, thereby maintaining a better color reproducibility of the fused image.

In some embodiments, the image fusion device may obtain the fused weight by determining a weighted average value of visWeight and difAlpha.

In 404b, the image fusion device may generate the fused image based on the fused weight map, the low-frequency component of the visible image, and the low-frequency component of the infrared image.

In some embodiments, the image fusion device may obtain the fused image according to formula (9) below:

$$Y = VL + \text{difAlpha} * \text{adjustdif} \qquad (9)$$

where Y refers to a luminance of a specific window in the fused image, adjustdif refers to the adjusted low-frequency component difference corresponding to the specific window, difAlpha refers to the fused weight corresponding to the specific window, and VL refers to the low-frequency component of the specific window in the visible image.

In some embodiments, the image fusion device may monotonically adjust the luminance of the fused image in two dimensions based on the luminance of the infrared image and the luminance of the visible image respectively, which can avoid a luminance reversal in the fused image.

In some embodiment, when a luminance of a region (e.g., a window) in the visible image is higher than visValidLuma, which indicates that the region has a relatively high luminance confidence, so that the image fusion device may directly use visLimit as the luminance weight corresponding to the region in the visible image. In some embodiment, when the luminance of the region in the visible image is lower than visValidLuma, which indicates that the region is relatively dark and has a relatively low luminance confidence, so that the image fusion device may progressively reduce the luminance weight corresponding to the region in the visible image from visLimit. In some embodiment, difLimit may affect the luminance weight associated with the infrared image. The higher the difLimit is, the higher a proportion of the infrared image in the fused image may be.

In some embodiment, value ranges of visValidLuma and difLimit may be the same as the bit width of the visible image, a value range of visLimit may be 0-4 floating point, a value range of visWeight may be 0-4 floating point, and a value range of nirWeight may be 0-31 floating point.

According to the present disclosure, the image fusion device may perform an illuminating operation on a region with relatively low luminance in the visible image based on the predetermined adjustment threshold, which can avoid a luminance reversal in the fused image and a stretching abnormality of the visible image caused by excessively increasing the luminance of the visible image. Further, the image fusion device can control whether the visible image is the main component or the infrared image is the main component in the fused image by adjusting parameters such as visValidLuma, difLimit, visLimit, etc., which makes the image fusion process adaptable to many different application scenarios.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 6:
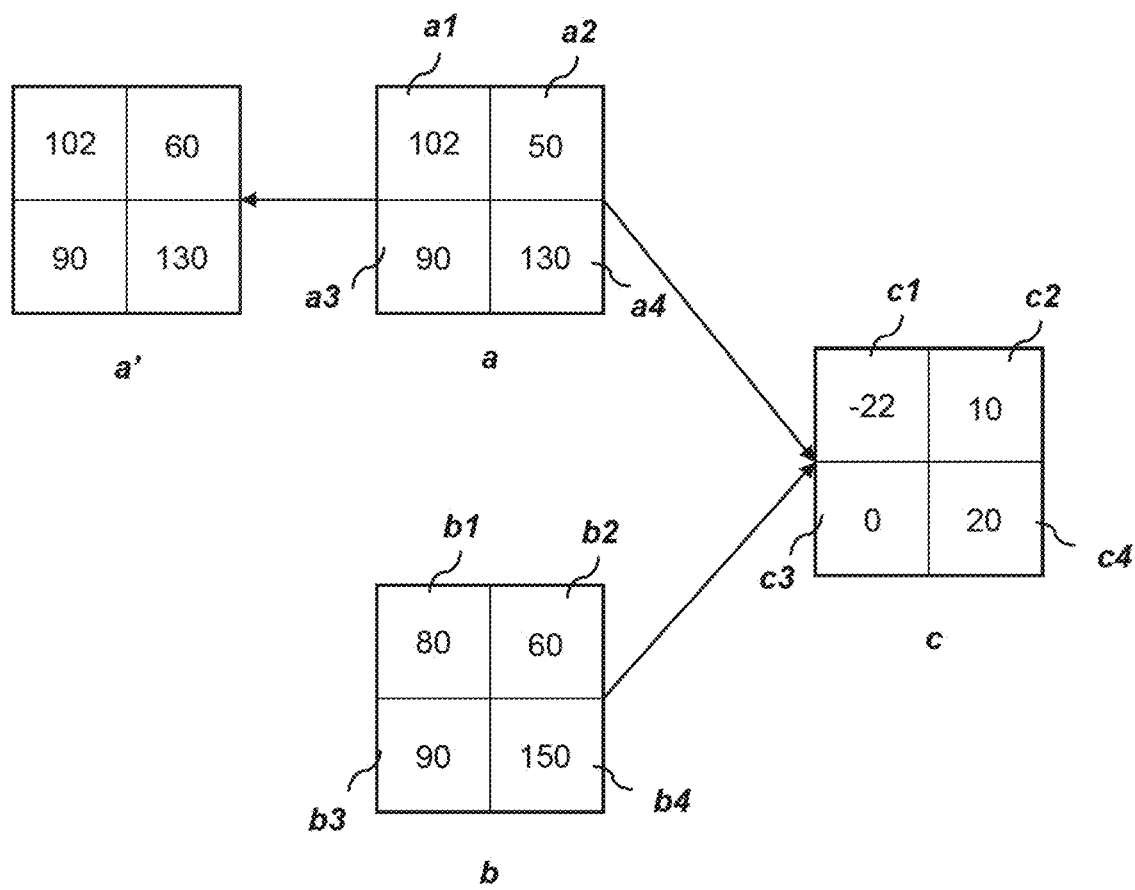
FIG. 6 is a schematic diagram illustrating exemplary luminance values of windows in the visible image and the infrared image according to some embodiments of the present disclosure.

FIG. 6 is a schematic diagram illustrating exemplary luminance values of windows in a visible image and an infrared image according to some embodiments of the present disclosure. As described in connection with operation 401, the image fusion device may perform a low-pass filtering on the visible image to obtain low-frequency component (which indicates luminance information of the visible image) (e.g., a) of the visible image and perform a low-pass filtering on the infrared image to obtain low-frequency component (which indicates luminance information of the infrared image) (e.g., b) of the infrared image. As illustrated in FIG. 6, luminance values of a windows a1, a2, a3, and a4 in the visible image are 102, 50, 90, and 130 respectively; luminance values of windows b1, b2, b3, and b4 in the infrared image are 80, 60, 90, and 150, respectively.

As described in connection with operation 402, in response to determining that the luminance of any window in the visible image is less than a predetermined adjustment threshold, the image fusion device may increase the luminance of the window and obtain an adjusted luminance of the window. As illustrated in FIG. 6, the image fusion device may determine that a luminance (e.g., 50) of a window a2 in the visible image is less than the predetermined adjustment threshold (e.g., 60). Further, the image fusion device may increase the luminance of the window a2 to the predetermined adjustment threshold (e.g., 60) and obtain an adjusted luminance (e.g., 60) of the window a2.

As described in connection with operation 403, the image fusion device may obtain low-frequency component difference (which indicates a luminance difference between the visible image and the infrared image) between the visible image and the infrared image according to formula (5). As illustrated in FIG. 6, the image fusion device may obtain the low-frequency component difference (e.g., c) corresponding to each window by subtracting the low-frequency component (e.g., a) of the visible image from the low-frequency component (e.g., b) of the infrared image. It can be seen that the low-frequency component differences corresponding to windows c1 (corresponding to window a1 and b1), c2 (corresponding to window a2 and b2), c3 (corresponding to window a3 and b3), and c4 (corresponding to window a4 and b4) are −22, 10, 0, and 20 respectively.

Figure 7:
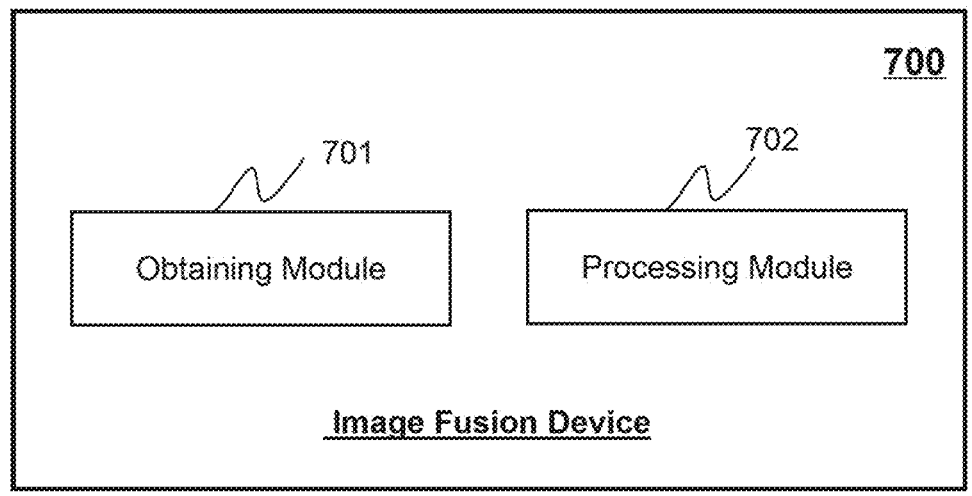
FIG. 7 is a block diagram illustrating an exemplary image fusion device according to some embodiments of the present disclosure.

FIG. 7 is a block diagram illustrating an exemplary image fusion device according to some embodiments of the present disclosure. The image fusion device 700 may include an obtaining module 701 and a processing module 702. In some embodiments, the image fusion device 700 may be integrated into the processing device 112.

The obtaining module 701 may be configured to obtain low-frequency component of a visible image and low-frequency component of an infrared image. The low-frequency component of the visible image may include a luminance of each window in the visible image. The low-frequency component of the infrared image may include a luminance of each window in the infrared image.

The processing module 702 may be configured to adjust (e.g., increase) a luminance of a window in the visible image in response to determining that the luminance of the window in the visible image is less than a predetermined adjustment threshold.

The processing module 702 may be also configured to obtain a luminance weight map corresponding to the visible image with adjusted luminance based on an adjusted luminance (or an original luminance if not adjusted) of each window in the visible image and a luminance weight map corresponding to the infrared image based on the luminance of each window in the infrared image.

The processing module 702 may be also configured to generate a fused image based on the low-frequency component of the visible image, the low-frequency component of the infrared image, the luminance weight map corresponding to the visible image with adjusted luminance, and the luminance weight map corresponding to the infrared image.

In some embodiments, the processing module 702 may be also configured to obtain the predetermined adjustment threshold based on a predetermined maximum weight associated with the visible image, a predetermined luminance confidence associated with the visible image, and a predetermined maximum weight associated with the infrared image. For example, the processing module 702 may obtain the predetermined adjustment threshold according to formula (2).

In some embodiment, the processing module 702 may be also configured to perform a compensation operation on the visible image until a luminance (e.g., a global luminance, a luminance of each window) of the compensated visible image reaches a predetermined target luminance and obtain a compensation value based on the compensation operation. Further, the processing module 702 may be also configured to obtain the predetermined maximum weight associated with the visible image or the predetermined maximum weight associated with the infrared image based on the compensation value according to a relationship between compensation value and maximum weight (e.g., the larger the compensation value is, the larger the maximum weight may be). As used herein, the relationship between the compensation value and the maximum weight may include at least one of a first relationship between the compensation value and the predetermined maximum weight associated with the visible image or a second relationship between the compensation value and the predetermined maximum weight associated with the infrared image.

In some embodiment, the processing module 702 may be also configured to obtain an initial luminance weight corresponding to each window in the visible image based on the predetermined maximum weight associated with the visible image, the predetermined luminance confidence associated with the visible image, and the adjusted luminance of each window in the visible image. For example, the processing module 702 may obtain the initial luminance weight corresponding to each window in the visible image according to formula (3). Further, the processing module 702 may be configured to obtain the luminance weight map corresponding to the visible image with adjusted luminance by performing an amplitude limiting on the initial luminance weight corresponding to each window in the visible image based on the predetermined maximum weight associated with the visible image. Taking a specific window in the visible image as an example, the processing module 702 may perform an amplitude limiting on the initial luminance weight corresponding to the window in the visible image according to formula (4).

In some embodiment, the processing module 702 may be also configured to obtain low-frequency component difference corresponding to each window based on the low-frequency component of each window in the infrared image and the low-frequency component of each window in the visible image. For example, the processing module 702 may obtain the low frequency component difference according to formula (5). Further, the processing module 702 may be configured to obtain the luminance weight map corresponding to the infrared image based on the predetermined maximum weight associated with the infrared image and the low-frequency component difference.

In some embodiment, the processing module 702 may be also configured to obtain an adjusted low-frequency component difference by processing the low-frequency component difference based on a predetermined first. For example, the processing module 702 may obtain the adjusted low frequency component difference according to formula (6). Further, the processing module 702 may be configured to obtain the luminance weight map corresponding to the infrared image based on the predetermined maximum weight associated with the infrared image and the adjusted low-frequency component difference. For example, the processing module 702 may obtain the luminance weight map corresponding to the infrared image according to formula (7).

In some embodiment, the processing module 702 may be also configured to obtain a fused weight map corresponding to the visible image and the infrared image based on the luminance weight map corresponding to the visible image with adjusted luminance and the luminance weight map corresponding to the infrared image. Further, the processing module 702 may be configured to generate a fused image based on the fused weight map, the low-frequency component of the visible image, and the low-frequency component of the infrared image.

The modules in the image fusion device 700 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

Figure 8:
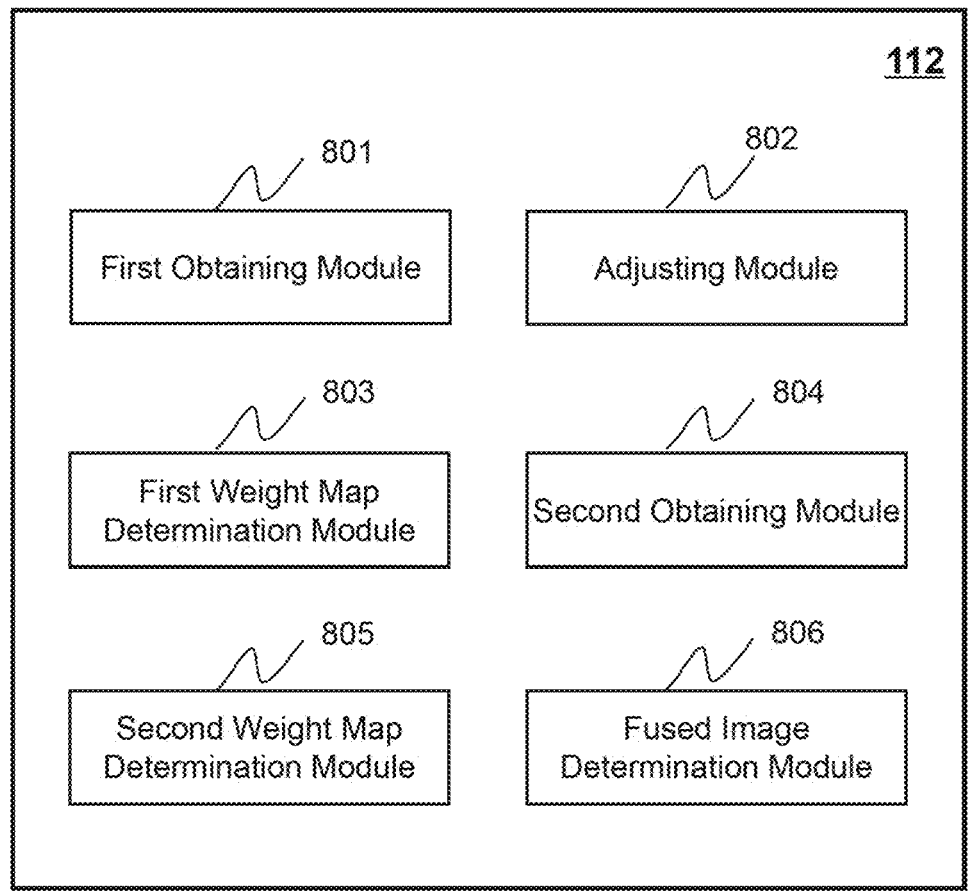
FIG. 8 is a block diagram illustrating an exemplary processing device according to some embodiments of the present disclosure.

FIG. 8 is a block diagram illustrating an exemplary processing device according to some embodiments of the present disclosure. The processing device 112 may include a first obtaining module 801, an adjusting module 802, a first weight map determination module 803, a second obtaining module 804, a second weight map determination module 805, and a fused image determination module 806.

The first obtaining module 801 may be configured to obtain low-frequency component of a first image (e.g., a visible image). The first obtaining module 801 may obtain the first image from the acquisition device 130, the user device 140, the storage device 150, etc. Further, the first obtaining module 801 may obtain the low-frequency component of the first image by performing a low-pass filtering on the first image, by converting image information (e.g., the luminance, the chrominance) of the first image into a luminance-chrominance separation color space, etc.

The adjusting module 802 may be configured to, for each element of the first image, determine whether the luminance of the element is less than a predetermined luminance threshold and adjust the luminance of the element of response to determining that the luminance of the element is less than the predetermined luminance threshold. In some embodiments, the adjusting module 802 may determine the predetermined luminance threshold based on a first predetermined maximum weight associated with the low-frequency component of the first image, a predetermined confidence coefficient associated with the first image, and a second predetermined maximum weight associated with the low-frequency component of the second image.

The first weight map determination module 803 may be configured to determine a first luminance weight map corresponding to the low-frequency component of the first image based on the adjusted luminance (or original luminance if not adjusted) of each element of the first image. In some embodiments, for each element of the first image, the first weight map determination module 803 may determine an initial luminance weight corresponding to the element based on the first predetermined maximum weight associated with the low-frequency component of the first image, the predetermined confidence coefficient associated with the first image, and the adjusted luminance of the element; determine a first luminance weight corresponding to the element by performing an amplitude limiting on the initial luminance weight; and determine the first luminance weight map by arranging a plurality of first luminance weights corresponding to a plurality of elements of the first image in the order of the elements.

The second obtaining module 804 may be configured to obtain low-frequency component of a second image (e.g., an infrared image). Similar to the first obtaining module 801, the second obtaining module 804 may obtain the first image from the acquisition device 130, the user device 140, the storage device 150, etc. Further, the second obtaining module 804 may obtain the low-frequency component of the second image by performing a low-pass filtering on the second image, by converting image information (e.g., the luminance, the chrominance) of the second image into a luminance-chrominance separation color space, etc.

The second weight map determination module 805 may be configured to determine a second luminance weight map corresponding to the low-frequency component of the second image based on the luminance of each element of the second image. In some embodiments, the second weight map determination module 805 may determine a low-frequency component difference based on the low-frequency component of the first image and the low-frequency component of the second image; determine an adjusted low-frequency component difference based on a predetermined coefficient; and determine a second luminance weight for each element of the second image based on the adjusted low-frequency component difference and the second predetermined maximum weight associated with the low-frequency component of the second image. Further, the second weight map determination module 805 may determine a second luminance weight map by arranging a plurality of second luminance weights corresponding to a plurality of elements of the second image in the order of the elements.

The fused image determination module 806 may be configured to determine a fused image based on the low-frequency component of the first image, the first luminance weight map, the low-frequency component of the second image, and the second luminance weight map. In some embodiments, the fused image determination module 806 may determine a fused luminance weight map based on the first luminance weight map and the second luminance weight map and determine the fused image based on the low-frequency component of the first image, the low-frequency component of the second image, and the fused luminance weight map.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

For example, the first obtaining module 801 and the second obtaining module 804 may be combined as a single module which may both obtain the low-frequency component of the first image and the low-frequency component of the second image. As another example, the first weight map determination module 803 and the second weight map determination module 805 may be combined as a single module which may both determine the first luminance weight map corresponding to the low-frequency component of the first image and the second luminance weight map corresponding to the low-frequency component of the second image. As a further example, the processing device 112 may also include a transmission module configured to transmit signals (e.g., electrical signals, electromagnetic signals) to one or more components (e.g., the user device 140) of the image processing 100 to display the fused image. As still a further example, the processing device 112 may include a storage module (not shown) used to store information and/or data (e.g., the low-frequency component, the luminance of each element, the predetermined luminance threshold, the luminance weight map) associated with the image (e.g., the first image, the second image, and the fused image).

Figure 9:
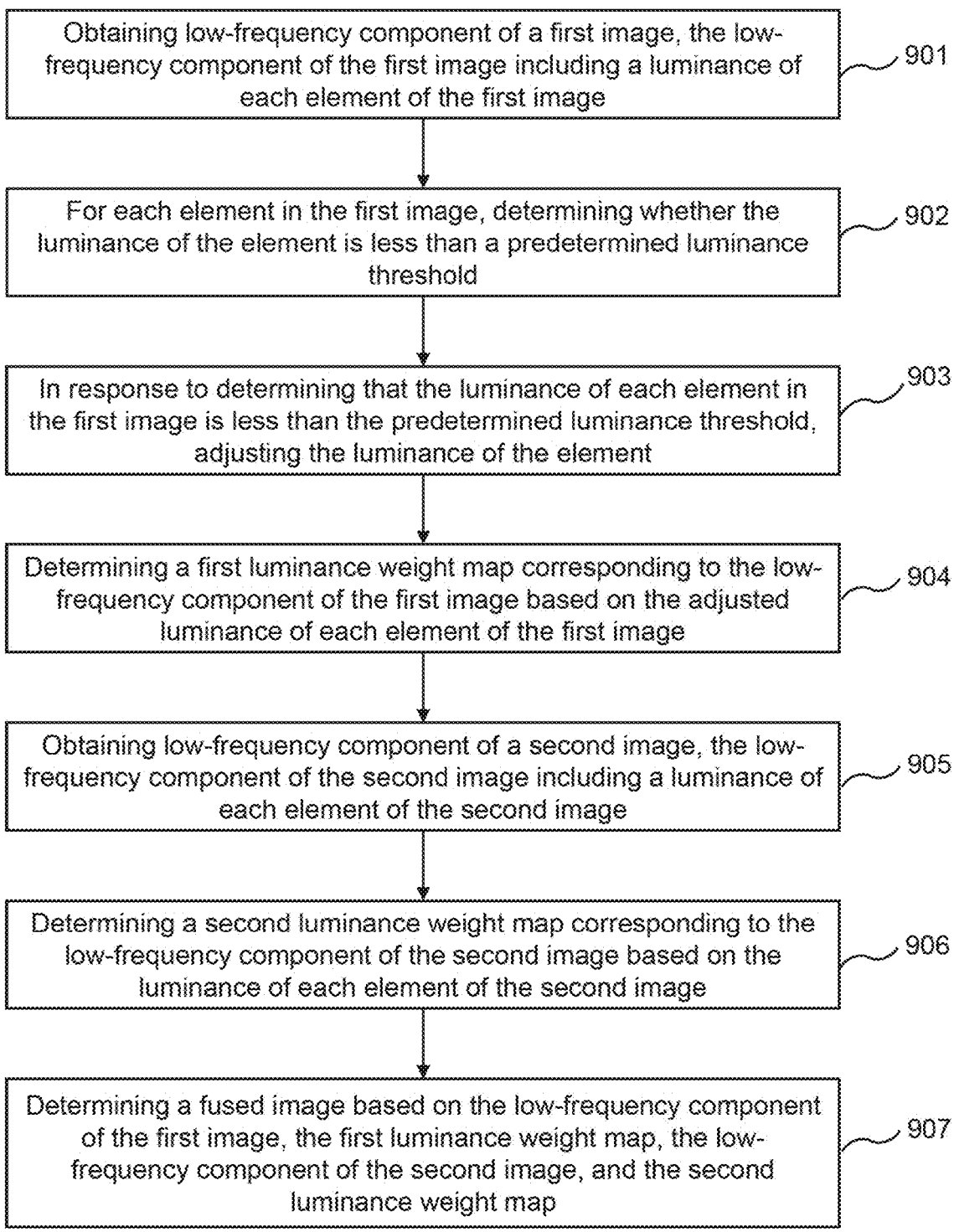
FIG. 9 is a flowchart illustrating an exemplary process for image processing according to some embodiments of the present disclosure.

FIG. 9 is a flowchart illustrating an exemplary process for image processing according to some embodiments of the present disclosure. In some embodiments, the process 900 may be implemented as a set of instructions (e.g., an application) stored in the storage ROM 230 or RAM 240. The processor 220 and/or the modules in FIG. 7 or FIG. 8 may execute the set of instructions, and when executing the instructions, the processor 220 and/or the modules may be configured to perform the process 900. The operations of the illustrated process presented below are intended to be illustrative. In some embodiments, the process 900 may be accomplished with one or more additional operations not described and/or without one or more of the operations herein discussed. Additionally, the order in which the operations of the process as illustrated in FIG. 9 and described below is not intended to be limiting.

In 901, the processing device 112 (e.g., the first obtaining module 801) (e.g., the processing circuits of the processor 220) may obtain low-frequency component of a first image (e.g., a visible image).

As described in connection with operation 401, the processing device 112 may obtain the first image from the acquisition device 130, the user device 140, the storage device 150, etc. Further, the processing device 112 may obtain the low-frequency component of the first image by performing a low-pass filtering on the first image, by converting image information (e.g., the luminance, the chrominance) of the first image into a luminance-chrominance separation color space, etc.

In some embodiments, the low-frequency component of the first image may include a luminance of each element of the first image. As used herein, the element may refer to a smallest image processing unit. It should be noted that a size of the element is not intended to be limiting, which may be a default setting of the image processing system 100 or may be adjustable under different situations. For example, the size of the element may be a pixel, 3 pixels*3 pixels, 5 pixels*5 pixels, 10 pixels*10 pixels, etc.

In 902, for each element of the first image, the processing device 112 (e.g., the adjusting module 802) (e.g., the processing circuits of the processor 220) may determine whether the luminance of the element is less than a predetermined luminance threshold.

In some embodiments, the processing device 112 may determine the predetermined luminance threshold based on a first predetermined maximum weight associated with the low-frequency component of the first image, a predetermined confidence coefficient associated with the first image, and a second predetermined maximum weight associated with the low-frequency component of the second image. For example, the processing device 112 may determine the predetermined luminance threshold according to formula (2). In some embodiments, at least one of the first predetermined maximum weight, the predetermined confidence coefficient, or the second predetermined maximum weight may be a default value or a user-defined value. In at least one of the first predetermined maximum weight, the predetermined confidence coefficient, or the second predetermined maximum weight may be determined based on a machine learning model. In some embodiments, the processing device 112 may determine the first predetermined maximum weight or the second predetermined maximum based on a compensation operation. More descriptions regarding determining the first predetermined maximum weight and/or second predetermined maximum weight may be found elsewhere in the present disclosure (e.g., FIG. 5, FIG. 10, and the descriptions thereof).

In some embodiments, the processing device 112 may determine the predetermined luminance threshold based on a luminance-weight function or a fused weight function. More descriptions regarding determining the predetermined luminance threshold may be found elsewhere in the present disclosure (e.g., FIG. 5, FIG. 12, and the descriptions thereof).

In 903, for each element of the first image, in response to determining that the luminance of the element is less than the predetermined luminance threshold, the processing device 112 (e.g., the adjusting module 802,) (e.g., the processing circuits of the processor 220) may adjust the luminance of the element.

As described in connection with operation 402, in response to determining that the luminance of the element is less than the predetermined luminance threshold, the processing device may increase the luminance of the element. For example, the processing device may set the luminance of the element as the predetermined luminance threshold or increase the luminance of the element by a predetermined value (e.g., a default value, a user-defined value). In response to determining that the luminance of the element is higher than or equal to the predetermined luminance threshold, the processing device may not change the luminance of the element.

In 904, the processing device 112 (e.g., the first weight map determination module 803) (e.g., the processing circuits of the processor 220) may determine a first luminance weight map corresponding to the low-frequency component of the first image based on the adjusted luminance (or original luminance if not adjusted) of each element of the first image.

As described in connection with operation 403, for each element of the first image, the processing device 112 may determine an initial luminance weight corresponding to the element based on the first predetermined maximum weight associated with the low-frequency component of the first image, the predetermined confidence coefficient associated with the first image, and the adjusted luminance of the element. For example, the processing device 112 may determine the initial luminance weight according to formula (3). The processing device 112 may also determine a first luminance weight corresponding to the element by performing an amplitude limiting on the initial luminance weight. For example, the processing device 112 may determine the first luminance weight according to formula (4). Further, the processing device 112 may determine the first luminance weight map by arranging a plurality of first luminance weights corresponding to a plurality of elements of the first image in the order of the elements. More descriptions regarding determining the first luminance weight map may be found elsewhere in the present disclosure (e.g., FIG. 5, FIG. 13, and the descriptions thereof).

In 905, the processing device 112 (e.g., the second obtaining module 804) (e.g., the processing circuits of the processor 220) may obtain low-frequency component of a second image (e.g., an infrared image).

As described in connection with operation 401, the processing device 112 may receive the second image from the acquisition device 130, the user device 140, the storage device 150, etc. Further, the processing device 112 may obtain the low-frequency component of the second image by performing a low-pass filtering on the second image, by converting image information (e.g., the luminance, the chrominance) of the second image into a luminance-chrominance separation color space, etc. The low-frequency component of the second image may include a luminance of each element of the second image.

In 906, the processing device 112 (e.g., the second weight map determination module 805) (e.g., the processing circuits of the processor 220) may determine a second luminance weight map corresponding to the low-frequency component of the second image based on the luminance of each element of the second image.

In some embodiments, as described in connection with operation 403, the processing device 112 may determine a low-frequency component difference based on the low-frequency component of the first image and the low-frequency component of the second image. For example, the processing device 112 may determine the low-frequency component difference according to formula (5). In some embodiments, the processing device 112 may determine an adjusted low-frequency component difference based on a predetermined coefficient. For example, the processing device 112 may determine the adjusted low-frequency component difference according to formula (6). For each element of the second image, the processing device 112 may determine a second luminance weight based on the adjusted low-frequency component difference and the second predetermined maximum weight associated with the low-frequency component of the second image. For example, the processing device 112 may determine the second luminance weight according to formula (7). Further, the processing device 112 may determine a second luminance weight map by arranging a plurality of second luminance weights corresponding to a plurality of elements of the second image in the order of the elements.

In some embodiments, as described in connection with operation 403, the processing device 112 may determine the second luminance weight map based on a luminance-weight function or a monotonic function. More descriptions regarding determining the second luminance weight map may be found elsewhere in the present disclosure (e.g., FIG. 5, FIG. 14, FIG. 15, and the descriptions thereof).

In 907, the processing device 112 (e.g., the fused image determination module 806) (e.g., the processing circuits of the processor 220) may determine a fused image based on the low-frequency component of the first image, the first luminance weight map, the low-frequency component of the second image, and the second luminance weight map.

As described in connection with operation 404, the processing device 112 may determine a fused luminance weight map based on the first luminance weight map and the second luminance weight map and determine the fused image based on the low-frequency component of the first image, the low-frequency component of the second image, and the fused luminance weight map. More descriptions regarding determining the fused image may be found elsewhere in the present disclosure (e.g., FIG. 5, FIG. 16 and the descriptions thereof).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

For example, one or more other optional operations (e.g., a storing operation) may be added elsewhere in the process 900. In the storing operation, the processing device 112 may store information and/or data (e.g., the low-frequency component, the luminance of each element, the predetermined luminance threshold, the luminance weight map) associated with the image (e.g., the first image, the second image, the fused image) in a storage device (e.g., the storage device 150) disclosed elsewhere in the present disclosure. As another example, operation 901 and operation 905 may be combined into a single operation in which the processing device 112 may both obtain the low-frequency component of the first image and the low-frequency component of the second image. As a further example, operation 904 and operation 906 may be combined into a single operation in which the processing device 112 may both determine the first luminance weight map corresponding to the low-frequency component of the first image and the second luminance weight map corresponding to the low-frequency component of the second image.

Figure 10:
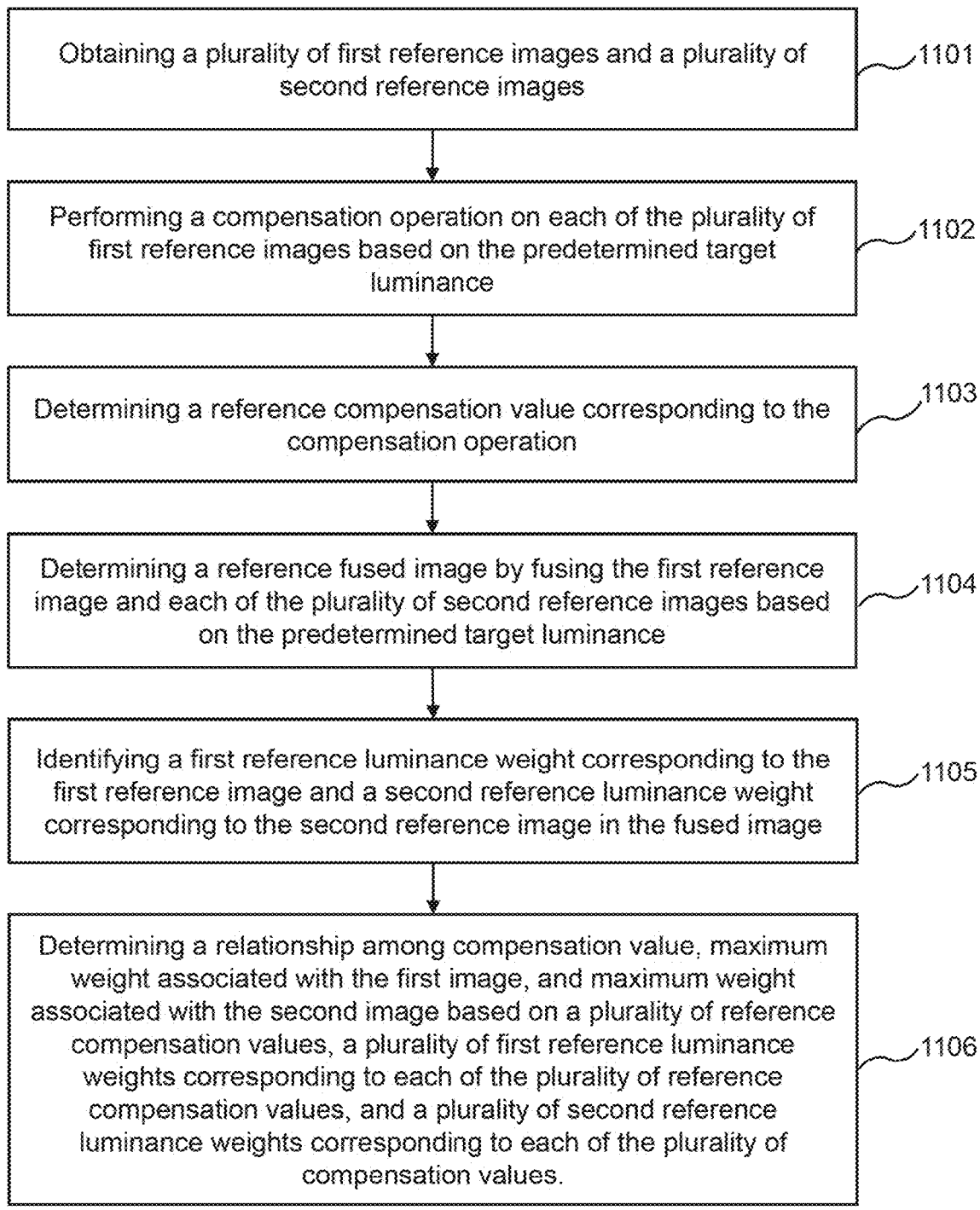
FIG. 10 is a flowchart illustrating an exemplary process for determining a predetermined maximum weight according to some embodiments of the present disclosure.

FIG. 10 is a flowchart illustrating an exemplary process for determining a predetermined maximum weight according to some embodiments of the present disclosure. In some embodiments, the process 1000 may be implemented as a set of instructions (e.g., an application) stored in the storage ROM 230 or RAM 240. The processor 220 and/or the modules in FIG. 7 and FIG. 8 may execute the set of instructions, and when executing the instructions, the processor 220 and/or the modules may be configured to perform the process 1000. The operations of the illustrated process presented below are intended to be illustrative. In some embodiments, the process 1000 may be accomplished with one or more additional operations not described and/or without one or more of the operations herein discussed. Additionally, the order in which the operations of the process as illustrated in FIG. 10 and described below is not intended to be limiting.

In 1001, the processing device 112 (e.g., the adjusting module 802) (e.g., the processing circuits of the processor 220) may perform a compensation operation on the first image (e.g., a visible image) based on a predetermined target luminance. As used herein, the predetermined target luminance may be a default setting of the image processing system 100 or may be adjustable under different situations. As described in connection with operation 402, the compensation operation may be understood as an operation for performing a gain on the first image.

In some embodiments, for each element of the first image, the processing device 112 may determine whether a luminance of the element is less than the predetermined target luminance. In response to determining that the luminance of the element is less than the predetermined target luminance, the processing device 112 may perform the gain on the first image until the luminance of the element reaches the predetermined target luminance and obtain a gain value corresponding to the element. In response to determining that the luminance of the element is higher than or equal to the predetermined target luminance, the processing device 112 may not perform the gain on the first image. Further, the processing device 112 may determine a compensation value associated with the compensation operation based on a plurality of gain values corresponding to the plurality of elements of the first image. For example, the processing device 112 may determine an average of the plurality of gain values as the compensation value.

In some embodiments, the processing device 112 may determine a global luminance (e.g., an average luminance) of the first image and determine whether the global luminance is less than the predetermined target luminance. In response to determining that the global luminance of the first image is less than the predetermined target luminance, the processing device 112 may perform the gain on the first image until the global luminance of the first image reaches the predetermined target luminance and obtain a gain value corresponding to the first image. Further, the processing device 112 may determine the gain value as the compensation value associated with the compensation operation.

In 1002, the processing device 112 (e.g., the adjusting module 802) (e.g., the processing circuits of the processor 220) may determine the first predetermined maximum weight associated with the low-frequency component of the first image or the second predetermined maximum weight associated with the low-frequency component of the second image based on the compensation value associated with the compensation operation according to a relationship (e.g., a relationship among compensation value, luminance weight corresponding to visible image, and luminance weight corresponding to infrared image) between compensation value and maximum weight (e.g., the larger the compensation value is, the larger the maximum weight may be). More descriptions regarding determining the relationship between compensation value and maximum weight may be found elsewhere in the present disclosure (e.g., FIG. 5, FIG. 11, and the descriptions thereof).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 11:
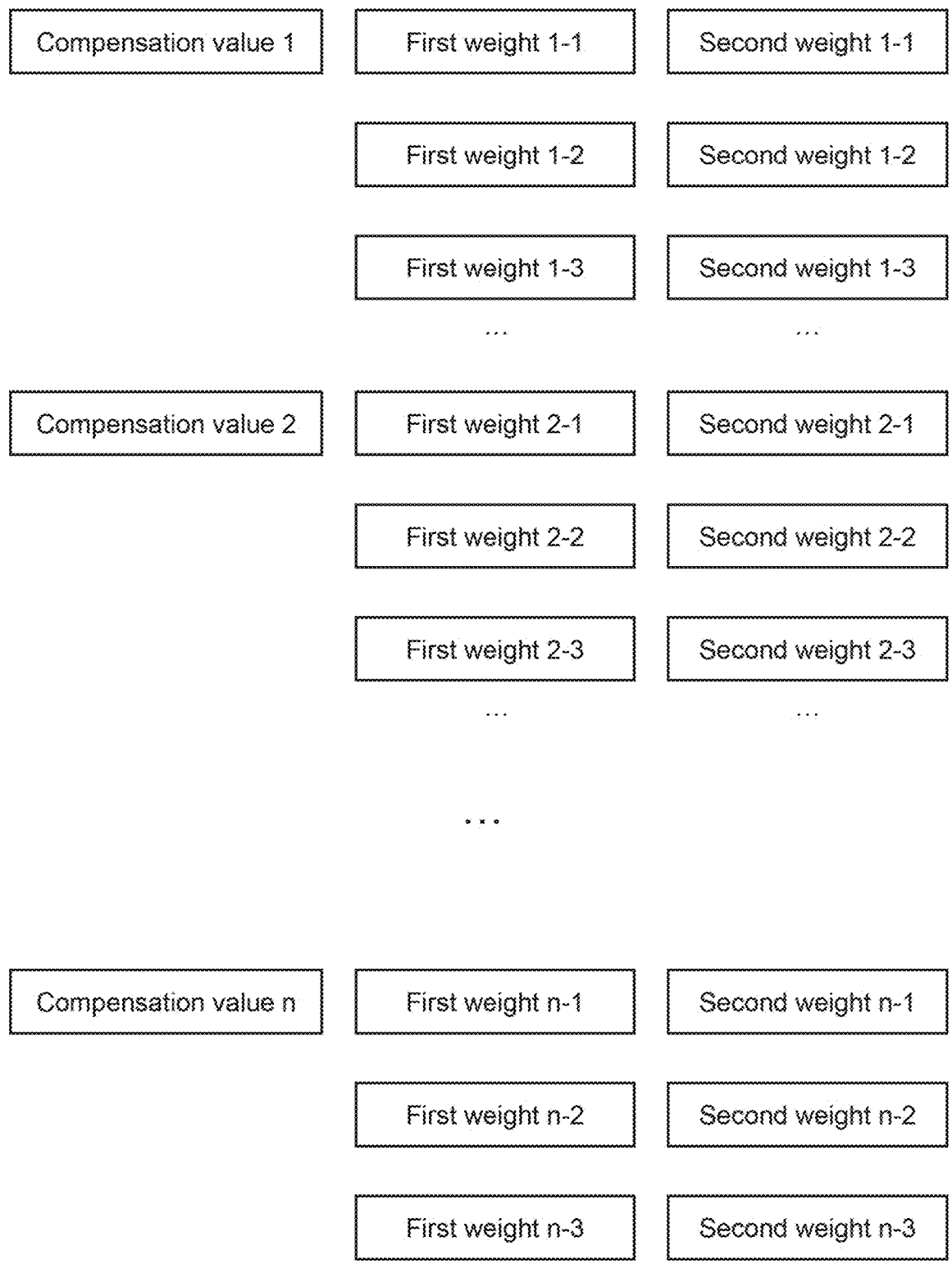
FIG. 11-A is a flowchart illustrating an exemplary process for determining a relationship associated with compensation value, first weight corresponding to visible image, and second weight corresponding to infrared image according to some embodiments of the present disclosure.

FIG. 11 is a flowchart illustrating an exemplary process for determining a relationship between compensation value and maximum weight according to some embodiments of the present disclosure. In some embodiments, the process 1100 may be implemented as a set of instructions (e.g., an application) stored in the storage ROM 230 or RAM 240. The processor 220 and/or the modules in FIG. 7 and FIG. 8 may execute the set of instructions, and when executing the instructions, the processor 220 and/or the modules may be configured to perform the process 1100. The operations of the illustrated process presented below are intended to be illustrative. In some embodiments, the process 1100 may be accomplished with one or more additional operations not described and/or without one or more of the operations herein discussed. Additionally, the order in which the operations of the process as illustrated in FIG. 11 and described below is not intended to be limiting.

In 1101, the processing device 112 (e.g., the adjusting module 802) (e.g., the processing circuits of the processor 220) may obtain a plurality of first reference images (e.g., reference visible image) and a plurality of second reference images (e.g., reference infrared image). In some embodiments, the processing device 112 may obtain the plurality of first reference images and the plurality of second reference images from a storage device (e.g., the storage device 150) disclosed elsewhere in the present disclosure.

In 1102, for each of the plurality of first reference images, the processing device 112 (e.g., the adjusting module 802) (e.g., the processing circuits of the processor 220) may perform a compensation operation on the first reference image based on the predetermined target luminance. As described in connection with operation 1001, the processing device 112 may perform a gain on the first reference image until a global luminance of the first reference image or a plurality of luminance values of a plurality of elements of the first reference image reach(es) the predetermined target luminance.

In 1103, for each of the plurality of first reference images, the processing device 112 (e.g., the adjusting module 802) (e.g., the processing circuits of the processor 220) may determine a reference compensation value (e.g., a gain value) corresponding to the compensation operation.

In 1104, for each of the plurality of first reference images, the processing device 112 (e.g., the adjusting module 802) (e.g., the processing circuits of the processor 220) may determine a reference fused image by fusing the first reference image and each of the plurality of second reference images based on the predetermined target luminance.

In some embodiments, the processing device 112 may determine and adjust a first reference luminance weight corresponding to the first reference image (or a first reference luminance weight map corresponding to each element of the first reference image) and a second reference luminance weight corresponding to each of the plurality of second reference images (or a second reference luminance weight map corresponding to each element of the second reference image) until a luminance of the fused image reaches the predetermined target luminance.

In 1105, for each of the plurality of first reference images, the processing device 112 (e.g., the adjusting module 802) (e.g., the processing circuits of the processor 220) may identify a first reference luminance weight corresponding to the first reference image and a second reference luminance weight corresponding to the second reference image in the reference fused image with the luminance reaching the predetermined target luminance.

In 1106, the processing device 112 (e.g., the adjusting module 802) (e.g., the processing circuits of the processor 220) may determine a relationship among compensation value, maximum weight corresponding to visible image, and maximum weight corresponding to infrared image based on a plurality of reference compensation values, a plurality of first reference luminance weights (corresponding to the plurality of first reference images) corresponding to each of the plurality of reference compensation values, and a plurality of second reference luminance weights (corresponding to the plurality of second reference images) corresponding to each of the plurality of reference compensation values.

For example, the processing device 112 may determine the relationship by performing a fitting operation on the plurality of reference compensation values, the plurality of first reference luminance weights, and the plurality of second reference luminance weights. As another example, as illustrated in FIG. 11-B, the processing device 112 may establish a multi-layer structure associated with compensation value, first weight corresponding to visible image, and second weight corresponding to infrared image and store the multi-layer structure in a storage device (e.g., the storage 150) disclosed elsewhere in the present disclosure. When determining the first predetermined maximum weight associated with the low-frequency component of the first image or the second predetermined maximum weight associated with the low-frequency component of the second image, the processing device 112 can determine a compensation value corresponding to the first image and access the multi-layer structure based on the compensation value to obtain the corresponding weights.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 12:
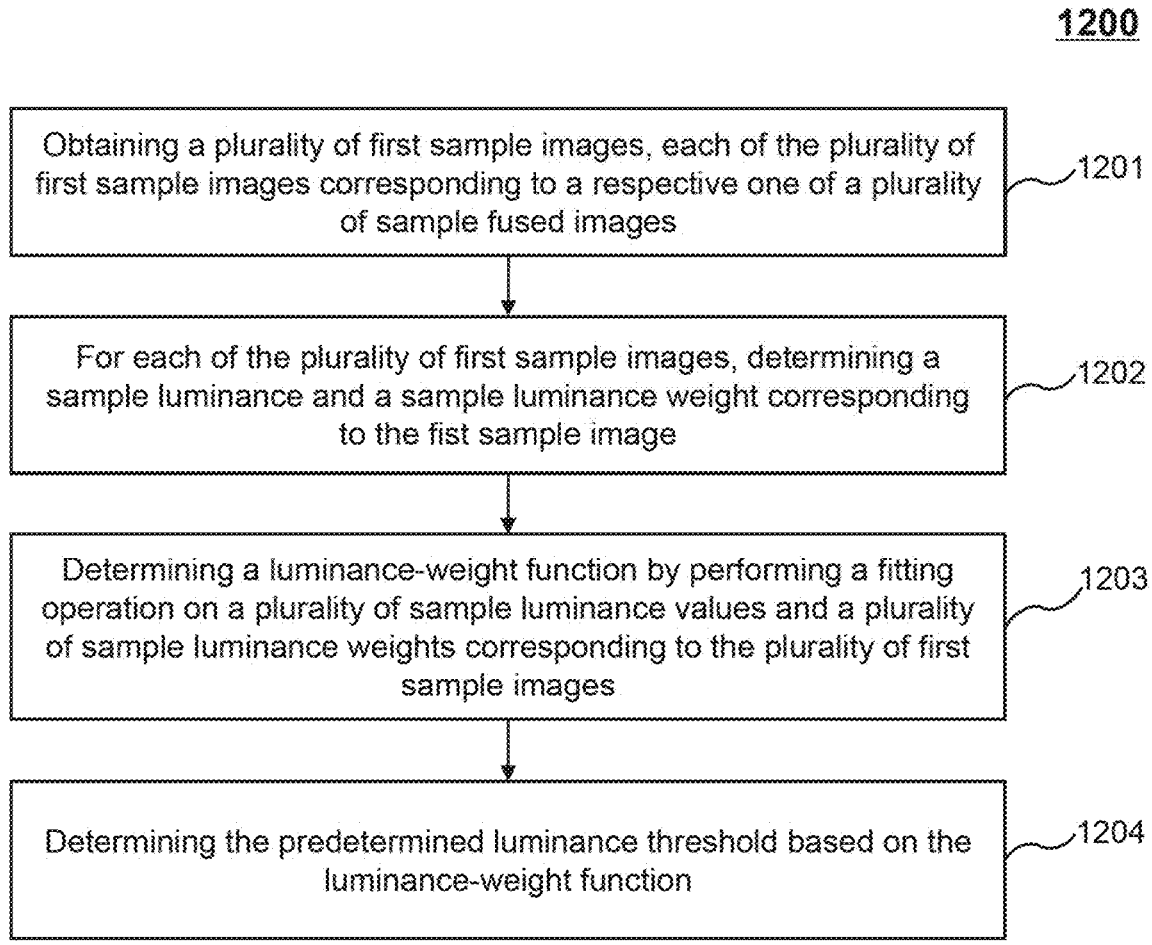
FIG. 12 is a flowchart illustrating an exemplary process for determining a predetermined luminance threshold according to some embodiments of the present disclosure.

FIG. 12 is a flowchart illustrating an exemplary process for determining a predetermined luminance threshold according to some embodiments of the present disclosure. In some embodiments, the process 1200 may be implemented as a set of instructions (e.g., an application) stored in the storage ROM 230 or RAM 240. The processor 220 and/or the modules in FIG. 7 and FIG. 8 may execute the set of instructions, and when executing the instructions, the processor 220 and/or the modules may be configured to perform the process 1200. The operations of the illustrated process presented below are intended to be illustrative. In some embodiments, the process 1200 may be accomplished with one or more additional operations not described and/or without one or more of the operations herein discussed. Additionally, the order in which the operations of the process as illustrated in FIG. 12 and described below is not intended to be limiting.

In 1201, the processing device 112 (e.g., the adjusting module 802) (e.g., the processing circuits of the processor 220) may obtain a plurality of first sample images, wherein each of the plurality of first sample images corresponds to a respective one of a plurality of sample fused images.

In some embodiments, the processing device 112 may obtain the plurality of first sample images from a storage device (e.g., the storage device 150) disclosed elsewhere in the present disclosure. In some embodiments, the plurality of the first sample images may be the same as, partially different from, or totally different from the plurality of first reference images described in FIG. 11. In some embodiments, the plurality of fused images may correspond to a same luminance and same second image (e.g., an infrared image).

In 1202, for each of the plurality of first sample images, the processing device 112 (e.g., the adjusting module 802) (e.g., the processing circuits of the processor 220) may determine a sample luminance and a sample luminance weight corresponding to the first sample image in a corresponding fused image.

In 1203, the processing device 112 (e.g., the adjusting module 802) (e.g., the processing circuits of the processor 220) may determine a luminance-weight function by performing a fitting operation on a plurality of sample luminance values and a plurality of sample luminance weights corresponding to the plurality of first sample images. As described in connection with FIG. 5, the luminance-weight function may be a monotonically increasing function.

In some embodiments, the processing device 112 may also determine a fused weight function based on the second predetermined maximum weight associated with the low-frequency component of the second image and the luminance-weight function.

In 1204, the processing device 112 (e.g., the adjusting module 802) (e.g., the processing circuits of the processor 220) may determine the predetermined luminance threshold based on the luminance-weight function.

As described in connection with FIG. 5, the processing device 112 may determine the predetermined luminance threshold by performing a derivative operation on the luminance-weight function or the fused weight function. For example, the predetermined luminance threshold may be a value corresponding to an inflection point at which the derivative of the fused weight function begins to reverse.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 13:
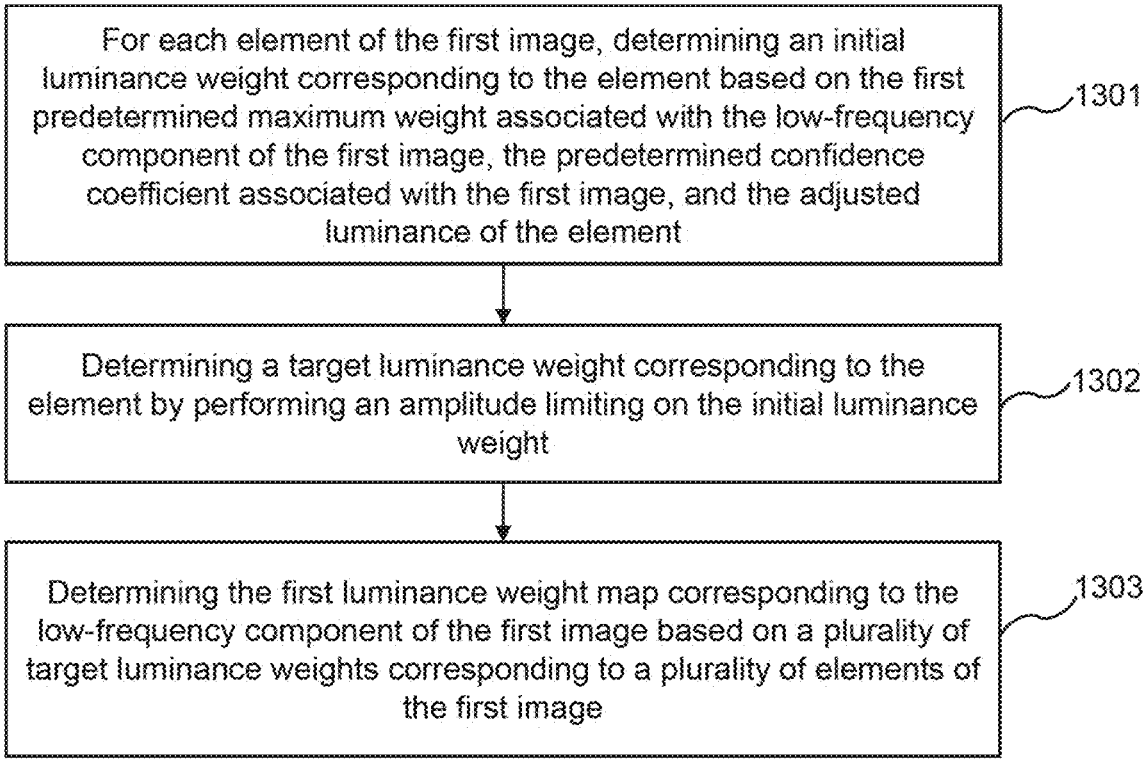
FIG. 13 is a flowchart illustrating an exemplary process for determining a first luminance weight map according to some embodiments of the present disclosure.

FIG. 13 is a flowchart illustrating an exemplary process for determining a first luminance weight map according to some embodiments of the present disclosure. In some embodiments, the process 1300 may be implemented as a set of instructions (e.g., an application) stored in the storage ROM 230 or RAM 240. The processor 220 and/or the modules in FIG. 7 and FIG. 8 may execute the set of instructions, and when executing the instructions, the processor 220 and/or the modules may be configured to perform the process 1300. The operations of the illustrated process presented below are intended to be illustrative. In some embodiments, the process 1300 may be accomplished with one or more additional operations not described and/or without one or more of the operations herein discussed. Additionally, the order in which the operations of the process as illustrated in FIG. 13 and described below is not intended to be limiting.

In 1301, for each element of the first image, the processing device 112 (e.g., the first weight map determination module 803) (e.g., the processing circuits of the processor 220) may determine an initial luminance weight corresponding to the element based on the first predetermined maximum weight associated with the low-frequency component of the first image, the predetermined confidence coefficient associated with the first image, and the adjusted luminance (or the original luminance if not adjusted) of the element. For example, the processing device 112 may determine the initial luminance weight corresponding to the element according to formula (3).

In 1302, for each element of the first image, the processing device 112 (e.g., the first weight map determination module 803) (e.g., the processing circuits of the processor 220) may determine a target luminance weight corresponding to the element by performing an amplitude limiting on the initial luminance weight. For example, the processing device 112 may determine the target luminance weight corresponding to the element according to formula (4).

In 1303, the processing device 112 (e.g., the first weight map determination module 803) (e.g., the processing circuits of the processor 220) may determine the first luminance weight map corresponding to the low-frequency component of the first image based on a plurality of target luminance weights corresponding to the plurality of elements of the first image. For example, the processing device 112 may determine the first luminance weight map by arranging the plurality of target luminance weights corresponding to the plurality of elements of the first image in the order of the elements.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 14 is a flowchart illustrating an exemplary process for determining a second luminance weight map according to some embodiments of the present disclosure. In some embodiments, the process 1400 may be implemented as a set of instructions (e.g., an application) stored in the storage ROM 230 or RAM 240. The processor 220 and/or the modules in FIG. 7 and FIG. 8 may execute the set of instructions, and when executing the instructions, the processor 220 and/or the modules may be configured to perform the process 1400. The operations of the illustrated process presented below are intended to be illustrative. In some embodiments, the process 1400 may be accomplished with one or more additional operations not described and/or without one or more of the operations herein discussed. Additionally, the order in which the operations of the process as illustrated in FIG. 14 and described below is not intended to be limiting.

In 1401, the processing device 112 (e.g., the second weight map determination module 805) (e.g., the processing circuits of the processor 220) may determine low-frequency component difference based on the low-frequency component of the first image and the low-frequency component of the second image. For example, the processing device 112 may obtain the low-frequency component difference according to formula (5).

In some embodiments, for each element of the low-frequency component difference, the processing device 112 may determine an adjusted luminance based on a predetermined coefficient. As used herein, the predetermined coefficient (e.g., k) may be a default setting (e.g., [0, 1]) of the image processing system 100 or may be adjustable under different situations. As described in connection with operation 403, the processing device 112 may determine the adjusted luminance of each window in the low-frequency component difference based on the predetermined coefficient according to formula (6).

In 1402, the processing device 112 (e.g., the second weight map determination module 805) (e.g., the processing circuits of the processor 220) may determine the second luminance weight map corresponding to the low-frequency component of the second image based on the second predetermined maximum weight associated with the low-frequency component of the second image and the adjusted luminance (or original luminance if not adjusted) of each element of the low-frequency component difference image.

In some embodiments, for each element of the second image, the processing device 112 may determine a second luminance weight corresponding to the element based on the second predetermined maximum weight and the adjusted luminance of the element of the low-frequency component difference. For example, the processing device 112 may determine the second luminance weight according to formula (7). Further, the processing device 112 may determine the second luminance weight map by arranging a plurality of second luminance weights corresponding to the plurality of elements in the order of the elements.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 15:
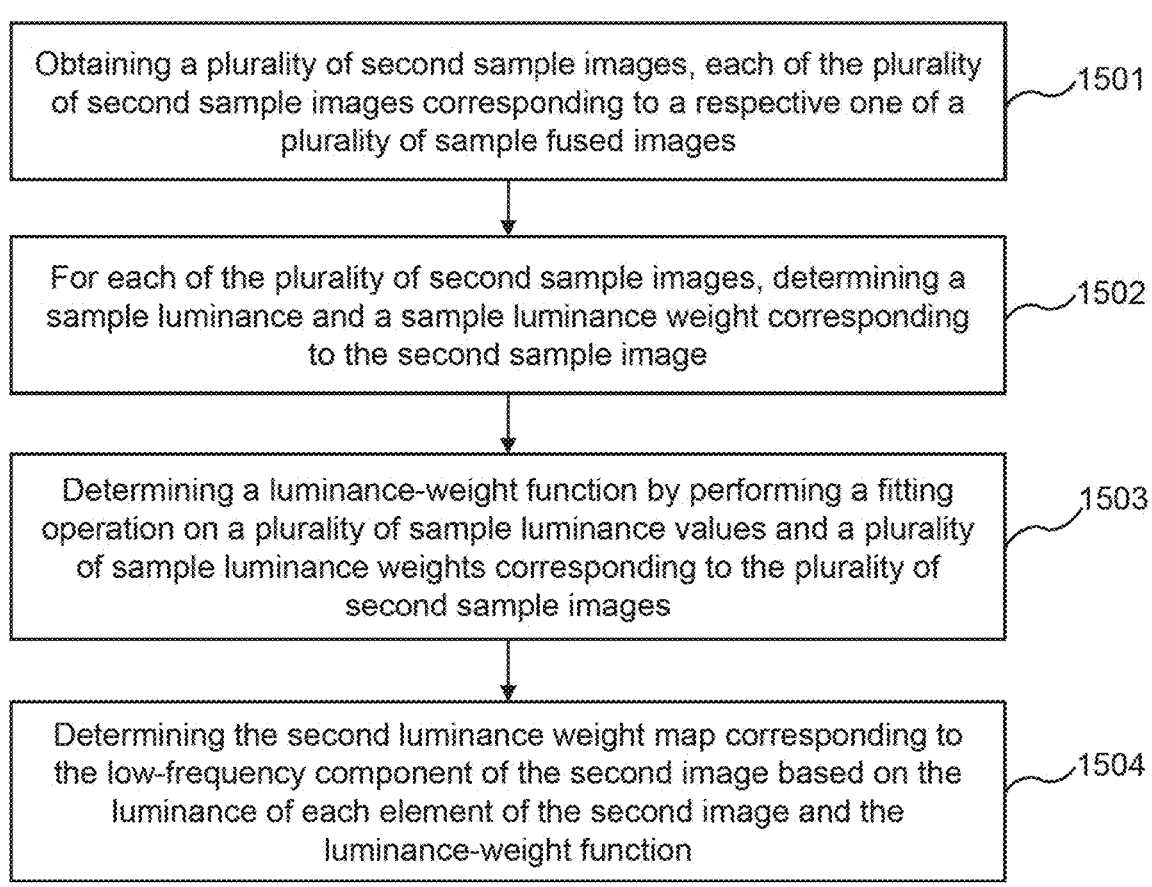
FIG. 15 is a flowchart illustrating an exemplary process for determining a second luminance weight map according to some embodiments of the present disclosure.

FIG. 15 is a flowchart illustrating an exemplary process for determining a second luminance weight map according to some embodiments of the present disclosure. In some embodiments, the process 1500 may be implemented as a set of instructions (e.g., an application) stored in the storage ROM 230 or RAM 240. The processor 220 and/or the modules in FIG. 7 and FIG. 8 may execute the set of instructions, and when executing the instructions, the processor 220 and/or the modules may be configured to perform the process 1500. The operations of the illustrated process presented below are intended to be illustrative. In some embodiments, the process 1500 may be accomplished with one or more additional operations not described and/or without one or more of the operations herein discussed. Additionally, the order in which the operations of the process as illustrated in FIG. 15 and described below is not intended to be limiting.

In 1501, the processing device 112 (e.g., the second weight map determination module 805) (e.g., the processing circuits of the processor 220) may obtain a plurality of second sample images, wherein each of the plurality of second sample images corresponds to a respective one of a plurality of sample fused images.

In some embodiments, the processing device 112 may obtain the plurality of second sample images from a storage device (e.g., the storage device 150) disclosed elsewhere in the present disclosure. In some embodiments, the plurality of sample fused images may correspond to a same luminance and a same first image (e.g., a visible image).

In 1502, for each of the plurality of second sample images, the processing device 112 (e.g., the second weight map determination module 805) (e.g., the processing circuits of the processor 220) may determine a sample luminance and a sample luminance weight corresponding to the second sample image in a corresponding fused image.

In 1503, the processing device 112 (e.g., the second weight map determination module 805) (e.g., the processing circuits of the processor 220) may determine a luminance-weight function by performing a fitting operation on a plurality of sample luminance values and a plurality of sample luminance weights corresponding to the plurality of second sample images. As described in connection with FIG. 5, the luminance-weight function may be a monotonically increasing function.

In 1504, the processing device 112 (e.g., the second weight map determination module 805) (e.g., the processing circuits of the processor 220) may determine the second luminance weight map corresponding to the low-frequency component of the second image based on the luminance of each element of the second image and the luminance-weight function.

In some embodiments, for each element of the second image, the processing device 112 may determine a second luminance weight corresponding to the element based on the luminance of the element and the luminance-weight function. Further, the processing device 112 may determine the second luminance weight map by arranging a plurality of second luminance weights corresponding to the plurality of elements in the order of the elements.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 16:
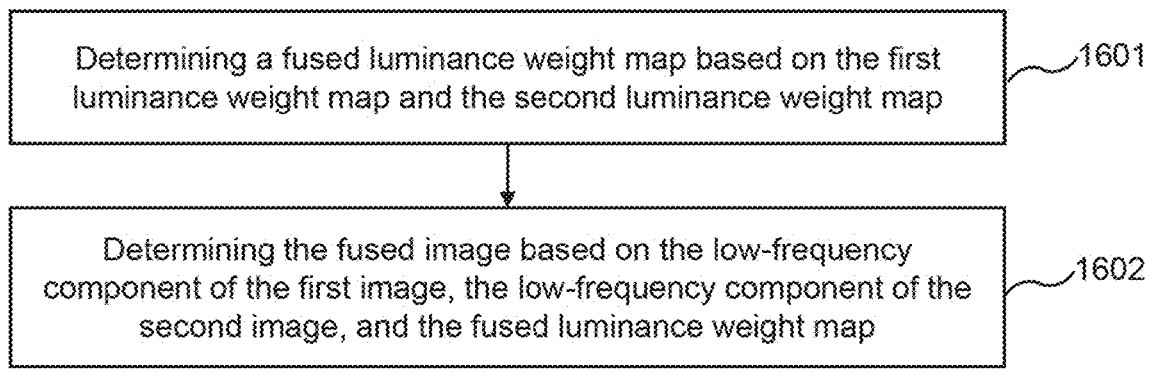
FIG. 16 is a flowchart illustrating an exemplary process for determining a fused image according to some embodiments of the present disclosure.

FIG. 16 is a flowchart illustrating an exemplary process for determining a fused image according to some embodiments of the present disclosure. In some embodiments, the process 1600 may be implemented as a set of instructions (e.g., an application) stored in the storage ROM 230 or RAM 240. The processor 220 and/or the modules in FIG. 7 and FIG. 8 may execute the set of instructions, and when executing the instructions, the processor 220 and/or the modules may be configured to perform the process 1600. The operations of the illustrated process presented below are intended to be illustrative. In some embodiments, the process 1600 may be accomplished with one or more additional operations not described and/or without one or more of the operations herein discussed. Additionally, the order in which the operations of the process as illustrated in FIG. 16 and described below is not intended to be limiting.

In 1601, the processing device 112 (e.g., the fused image determination module 806) (e.g., the processing circuits of the processor 220) may determine a fused luminance weight map based on the first luminance weight map and the second luminance weight map.

For example, for each element, the processing device 112 may determine a fused luminance weight corresponding to the element based on a corresponding first luminance weight and a corresponding second luminance weight according to formula (8). Further, the processing device 112 may determine a fused luminance weight map by arranging a plurality of fused luminance weights corresponding to a plurality of elements in the order of the elements.

In 1602, the processing device 112 (e.g., the fused image determination module 806) (e.g., the processing circuits of the processor 220) may determine the fused image based on the low-frequency component of the first image, the low-frequency component of the second image, and the fused luminance weight map. For example, the processing device may determine a luminance of each window in the fused image according to formula (9). Further, the processing device 112 may determine the fused image based on the luminance of each window and high-frequency information extracted from the first image or the second image.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

In some embodiments, the present disclosure may also provide a computer readable storage medium storing a computer program thereon. When executing by at least one processor, the executable instructions may direct the at least one processor to perform a process (e.g., process 400, process 900, process 1000, process 1100, process 1200, process 1300, process 1400, process 1500, process 1600) described elsewhere in the present disclosure.

For illustration purposes, the present disclosure takes a fusion process associated with a visible image and an infrared image as an example, it should be noted that the image fusion process can be applied in images collected based on different light sources (e.g., a blue light, a green light).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for image processing, comprising:
 at least one storage medium including a set of instructions; and
 at least one processor in communication with the at least one storage medium, wherein when executing the set of instructions, the at least one processor is directed to cause the system to:
  obtain low-frequency component of a first image, the low-frequency component of the first image including a luminance of each element of the first image, wherein,
   for each element of the first image,
    determine whether the luminance of the element is less than a predetermined luminance threshold; and
    in response to determining that the luminance of the element is less than the predetermined luminance threshold, adjust the luminance of the element;
  determine a first luminance weight map corresponding to the low-frequency component of the first image based on the adjusted luminance of each element of the first image;
  obtain low-frequency component of a second image, the low-frequency component of the second image including a luminance of each element of the second image;

determine a second luminance weight map corresponding to the low-frequency component of the second image based on the luminance of each element of the second image; and determine a fused image based on the low-frequency component of the first image, the first luminance weight map, the low-frequency component of the second image, and the second luminance weight map.

2. The system of claim 1, wherein the predetermined luminance threshold is determined based on a first predetermined maximum weight associated with the low-frequency component of the first image, a predetermined confidence coefficient associated with the first image, and a second predetermined maximum weight associated with the low-frequency component of the second image.

3. The system of claim 2, wherein the first predetermined maximum weight associated with the low-frequency component of the first image or the second predetermined maximum weight associated with the low-frequency component of the second image is determined by:

performing a compensation operation on the first image based on a predetermined target luminance; and determining the first predetermined maximum weight associated with the low-frequency component of the first image or the second predetermined maximum weight associated with the low-frequency component of the second image based on a compensation value associated with the compensation operation according to a relationship between compensation value and maximum weight.

4. The system of claim 3, wherein
the relationship between compensation value and maximum weight is determined by:

obtaining a plurality of first reference images and a plurality of second reference images;

for each of the plurality of first reference images, performing a compensation operation on the first reference image based on the predetermined target luminance;

determining a reference compensation value corresponding to the compensation operation;

determining a reference fused image by fusing the first reference image and each of the plurality of second reference images based on the predetermined target luminance, and identifying a first reference luminance weight corresponding to the first reference image and a second reference luminance weight corresponding to the second reference image in the reference fused image; and determining the relationship between compensation value and maximum weight based on a plurality of reference compensation values, a plurality of first reference luminance weights corresponding to each of the plurality of compensation values, and a plurality of second reference luminance weights corresponding to each of the plurality of compensation values.

5. The system of claim 2, wherein at least one of the first predetermined maximum weight associated with the low-frequency component of the first image, the predetermined confidence coefficient associated with the first image, or the second predetermined maximum weight associated with the low-frequency component of the second image is a default value or a user-defined value.

6. The system of claim 2, wherein to determine the first luminance weight map corresponding to the low-frequency component of the first image based on the adjusted luminance of each element of the first image, the at least one processor is directed to cause the system to:

for each element of the first image, determine an initial luminance weight corresponding to the element based on the first predetermined maximum weight associated with the low-frequency component of the first image, the predetermined confidence coefficient associated with the first image, and the adjusted luminance of the element; and determine a target luminance weight corresponding to the element by performing an amplitude limiting on the initial luminance weight; and determine the first luminance weight map corresponding to the low-frequency component of the first image based on a plurality of target luminance weights corresponding to a plurality of elements of the first image.

7. The system of claim 2, wherein to determine the second luminance weight map corresponding to the low-frequency component of the second image based on the luminance of each element of the second image, the at least one processor is directed to cause the system to:

determine a low-frequency component difference based on the low-frequency component of the first image and the low-frequency component of the second image; and determine the second luminance weight map corresponding to the low-frequency component of the second image based on the second predetermined maximum weight associated with the low-frequency component of the second image and a luminance of each element of the low-frequency component difference.

8. The system of claim 7, wherein to determine the second luminance weight map corresponding to the low-frequency component of the second image based on the luminance of each element of the second image, the at least one processor is directed to cause the system to:

for each element of the low-frequency component difference, determine an adjusted luminance based on a predetermined coefficient; and determine the second luminance weight map corresponding to the low-frequency component of the second image based on the second predetermined maximum weight associated with the low-frequency component of the second image and the adjusted luminance of each element of the low-frequency component difference.

9. The system of claim 1, wherein the predetermined luminance threshold is determined by:

obtaining a plurality of first sample images, each of the plurality of first sample images corresponding to a respective one of a plurality of sample fused images;

for each of the plurality of first sample images, determining a sample luminance and a sample luminance weight corresponding to the first sample image;

determining a luminance-weight function by performing a fitting operation on a plurality of sample luminance values and a plurality of sample luminance weights corresponding to the plurality of first sample images; and determining the predetermined luminance threshold based on the luminance-weight function.

10. The system of claim 1, wherein to determine the second luminance weight map corresponding to the low-frequency component of the second image based on the luminance of each element of the second image, the at least one processor is directed to cause the system to:

obtain a plurality of second sample images, each of the plurality of second sample images corresponding to a respective one of a plurality of sample fused images;

for each of the plurality of second sample images, determine a sample luminance and a sample luminance weight corresponding to the second sample image;

determine a luminance-weight function by performing a fitting operation on a plurality of sample luminance values and a plurality of sample luminance weights corresponding to the plurality of second sample images; and determine the second luminance weight map corresponding to the low-frequency component of the second image based on the luminance of each element of the second image and the luminance-weight function.

11. The system of claim 1, wherein to determine the fused image based on the low-frequency component of the first image, the first luminance weight map, the low-frequency component of the second image, and the second luminance weight map, the at least one processor is directed to cause the system to:

determine a fused luminance weight map based on the first luminance weight map and the second luminance weight map; and determine the fused image based on the low-frequency component of the first image, the low-frequency component of the second image, and the fused luminance weight map.

12. The system of claim 1, wherein the first image is a visible image and the second image is an infrared image.

13. A method implemented on a computing device including at least one processor, at least one storage medium, and a communication platform connected to a network, the method comprising:

obtaining low-frequency component of a first image, the low-frequency component of the first image including a luminance of each element of the first image, wherein, for each element of the first image,
determining whether the luminance of the element is less than a predetermined luminance threshold; and
in response to determining that the luminance of the element is less than the predetermined luminance threshold, adjusting the luminance of the element;

determining a first luminance weight map corresponding to the low-frequency component of the first image based on the adjusted luminance of each element of the first image;

obtaining low-frequency component of a second image, the low-frequency component of the second image including a luminance of each element of the second image;

determining a second luminance weight map corresponding to the low-frequency component of the second image based on the luminance of each element of the second image; and determining a fused image based on the low-frequency component of the first image, the first luminance weight map, the low-frequency component of the second image, and the second luminance weight map.

14. The method of claim 13, wherein the predetermined luminance threshold is determined based on a first predetermined maximum weight associated with the low-frequency component of the first image, a predetermined confidence coefficient associated with the first image, and a second predetermined maximum weight associated with the low-frequency component of the second image.

15. The method of claim 14, wherein the first predetermined maximum weight associated with the low-frequency component of the first image or the second predetermined maximum weight associated with the low-frequency component of the second image is determined by:

performing a compensation operation on the first image based on a predetermined target luminance; and determining the first predetermined maximum weight associated with the low-frequency component of the first image or the second predetermined maximum weight associated with the low-frequency component of the second image based on a compensation value associated with the compensation operation according to a relationship between compensation value and maximum weight.

16. The method of claim 15, wherein
the relationship between compensation value and maximum weight is determined by:

obtaining a plurality of first reference images and a plurality of second reference images;

for each of the plurality of first reference images,
performing a compensation operation on the first reference image based on the predetermined target luminance;

determining a reference compensation value corresponding to the compensation operation;

determining a reference fused image by fusing the first reference image and each of the plurality of second reference images based on the predetermined target luminance; and identifying a first reference luminance weight corresponding to the first reference image and a second reference luminance weight corresponding to the second reference image in the reference fused image; and determining the relationship between compensation value and maximum weight based on a plurality of reference compensation values, a plurality of first reference luminance weights corresponding to each of the plurality of compensation values, and a plurality of second reference luminance weights corresponding to each of the plurality of compensation values.

17. The method of claim 14, wherein the determining the first luminance weight map corresponding to the low-frequency component of the first image based on the adjusted luminance of each element of the first image including:

for each element of the first image,
determining an initial luminance weight corresponding to the element based on the first predetermined maximum weight associated with the low-frequency component of the first image, the predetermined confidence coefficient associated with the first image, and the adjusted luminance of the element; and determining a target luminance weight corresponding to the element by performing an amplitude limiting on the initial luminance weight; and determining the first luminance weight map corresponding to the low-frequency component of the first image based on a plurality of target luminance weights corresponding to a plurality of elements of the first image.

18. The method of claim 14, wherein the determining the second luminance weight map corresponding to the low-frequency component of the second image based on the luminance of each element of the second image including:
  determining a low-frequency component difference based on the low-frequency component of the first image and the low-frequency component of the second image; and
  determining the second luminance weight map corresponding to the low-frequency component of the second image based on the second predetermined maximum weight associated with the low-frequency component of the second image and a luminance of each element of the low-frequency component difference.

19. The method of claim 13, wherein the predetermined luminance threshold is determined by:
  obtaining a plurality of first sample images, each of the plurality of first sample images corresponding to a respective one of a plurality of sample fused images;
  for each of the plurality of first sample images, determining a sample luminance and a sample luminance weight corresponding to the first sample image;
  determining a luminance-weight function by performing a fitting operation on a plurality of sample luminance values and a plurality of sample luminance weights corresponding to the plurality of first sample images; and
  determining the predetermined luminance threshold based on the luminance-weight function.

20. A non-transitory computer readable medium, comprising executable instructions that, when executed by at least one processor, direct the at least one processor to perform a method, the method comprising:
  obtaining low-frequency component of a first image, the low-frequency component of the first image including a luminance of each element of the first image, wherein,
    for each element of the first image,
      determining whether the luminance of the element is less than a predetermined luminance threshold; and
      in response to determining that the luminance of the element is less than the predetermined luminance threshold, adjusting the luminance of the element;
  determining a first luminance weight map corresponding to the low-frequency component of the first image based on the adjusted luminance of each element of the first image;
  obtaining low-frequency component of a second image, the low-frequency component of the second image including a luminance of each element of the second image;
  determining a second luminance weight map corresponding to the low-frequency component of the second image based on the luminance of each element of the second image; and
  determining a fused image based on the low-frequency component of the first image, the first luminance weight map, the low-frequency component of the second image, and the second luminance weight map.

* * * * *